(12) United States Patent
Ogawa et al.

(10) Patent No.: US 9,004,416 B2
(45) Date of Patent: Apr. 14, 2015

(54) CLAMP

(75) Inventors: Takaya Ogawa, Toyota (JP); Tomoaki Aoshima, Hamamatsu (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 13/510,435

(22) PCT Filed: Nov. 26, 2010

(86) PCT No.: PCT/JP2010/071112
§ 371 (c)(1),
(2), (4) Date: Jul. 30, 2012

(87) PCT Pub. No.: WO2011/065474
PCT Pub. Date: Jun. 3, 2011

(65) Prior Publication Data
US 2012/0298811 A1    Nov. 29, 2012

(30) Foreign Application Priority Data

Nov. 27, 2009  (JP) ............................... P2009-270207
Aug. 3, 2010   (JP) ............................... P2010-174925

(51) Int. Cl.
*F16L 3/13*      (2006.01)
*F16L 55/035*    (2006.01)

(52) U.S. Cl.
CPC  *F16L 3/13* (2013.01); *F16L 55/035* (2013.01)

(58) Field of Classification Search
CPC ............. F16L 3/10; F16L 3/1091; F16L 3/12; F16L 3/13
USPC ........... 248/65, 67.7, 70, 74.1, 74.2, 74.4, 55, 248/230.1, 230.4, 230.5, 230.2, 230.6, 248/230.7, 231.31, 231.51, 231.61, 231.71, 248/316.1, 316.2, 316.5, 316.6, 316.7; 24/530, 555, 564, 458, 457, 297
See application file for complete search history.

(56) References Cited

U.S. PATENT DOCUMENTS 1,129,782 A  *  2/1915  Bissell et al. .................. 174/155
4,338,707 A  *  7/1982  Byerly ............................. 24/542
(Continued)

FOREIGN PATENT DOCUMENTS

| CN | 1542317 A | 11/2004 |
|---|---|---|
| EP | 1707859 A2 | 10/2006 |

(Continued)

OTHER PUBLICATIONS

China Patent Office, "Office Action for CN 201080053825.X", Nov. 1, 2013.
(Continued)

*Primary Examiner* — Jonathan Liu
*Assistant Examiner* — Guang H Guan
(74) *Attorney, Agent, or Firm* — Manabu Kanesaka

(57) ABSTRACT

A clamp includes a clamp main body, a flexible member, a pipe holding portion, a pipe insertion path, and a pair of opposite pieces. At least one opposite piece of the pair of opposite pieces, is pressed by an outer circumference of a pipe inserted into the pipe insertion path, and is bendable in a direction in which the pipe insertion path is expandable. One opposite piece extends up to a position adjacent to the pipe holding portion. An extending end portion of one opposite piece protrudes toward an inside of the pipe insertion path from one portion of the flexible member adjacent to the end portion.

11 Claims, 42 Drawing Sheets

(56) References Cited

U.S. PATENT DOCUMENTS

| | | | |
|---|---|---|---|
| 4,614,321 A * | 9/1986 | Andre | 248/74.2 |
| 4,799,444 A * | 1/1989 | Lisowski | 114/221 R |
| 4,840,334 A * | 6/1989 | Kikuchi | 248/73 |
| 5,277,387 A * | 1/1994 | Lewis et al. | 248/74.2 |
| 5,545,854 A * | 8/1996 | Ishida | 174/153 G |
| 6,371,419 B1 * | 4/2002 | Ohnuki | 248/74.2 |
| 6,747,209 B2 * | 6/2004 | Uchida et al. | 174/68.1 |
| 6,899,304 B2 * | 5/2005 | Bellmore et al. | 248/65 |
| 6,926,237 B2 * | 8/2005 | Shereyk et al. | 248/71 |
| 7,267,307 B2 | 9/2007 | Bauer | |
| 7,278,190 B2 * | 10/2007 | Fischer et al. | 24/530 |
| 8,534,614 B2 * | 9/2013 | Guthke et al. | 248/74.1 |
| 2002/0179780 A1 * | 12/2002 | Benoit et al. | 248/73 |
| 2004/0188570 A1 * | 9/2004 | Bauer | 248/68.1 |
| 2004/0217236 A1 | 11/2004 | Shibuya | |
| 2004/0251386 A1 | 12/2004 | Mizukoshi et al. | |
| 2006/0076462 A1 * | 4/2006 | Ceravalls Pujol et al. | 248/67.7 |
| 2008/0048072 A1 * | 2/2008 | Mizukoshi | 248/65 |
| 2013/0112817 A1 * | 5/2013 | Unger | 248/74.4 |

FOREIGN PATENT DOCUMENTS

| | | |
|---|---|---|
| JP | H11-63302 A | 3/1999 |
| JP | H11-108250 A | 4/1999 |
| JP | 3511754 B2 | 3/2004 |
| JP | 2004-257559 A | 9/2004 |
| JP | 2006-46535 A | 2/2006 |
| JP | 2008-268347 A | 11/2008 |
| JP | 2008-286347 A | 11/2008 |

OTHER PUBLICATIONS

Korea Patent Office, "Office Action for KR 10-2012-7010382," Feb. 21, 2014.

Japan Patent Office, "Office Action for JP 2010-174925," Sep. 30, 2014.

* cited by examiner

CLAMP

FIELD OF TECHNOLOGY

The present invention relates to a clamp holding a pipe, and also including an anti-vibration function. At a time of mounting the pipe, a bendable opposite piece of a clamp main body made of a hard member makes a contact with the pipe, so that the clamp prevents the pipe from making a contact with a flexible member, and allows an insertability of the pipe to improve.

BACKGROUND ART

Conventionally, there is well-known a clamp in which a rubber cushion material is attached to a pipe fitting portion of the clamp main body (for example, see paragraphs [0016], [0017], and [0019], and FIGS. 1 to 4 of Patent Document 1).

In the aforementioned conventional cushion member, there include an upper wall portion and a lower wall portion provided to extend toward an inside of the pipe fitting portion from an opening portion of the clamp main body (for example, see paragraph [0020], and FIGS. 1, 3, and 4 of the Patent Document 1).

The aforementioned conventional pipe is adapted to be mounted on the inside of the pipe fitting portion of the clamp main body through a space between the upper wall portion and the lower wall portion (for example, see the paragraph [0020], and FIGS. 3 and 4 of the Patent Document 1).

PRIOR ART DOCUMENT

Patent Document

Patent Document 1: Japanese Unexamined Patent Publication No. 2008-286347

SUMMARY OF THE INVENTION

Problems to be Solved by the Invention

In the aforementioned conventional clamp, the pipe is mounted through the space between the upper wall portion and the lower wall portion of the cushion member. However, at that time, since a friction resistance of the cushion member is large, there has been a problem that a possibility of failure may occur such as a rise in an insertion force of the pipe, peeling of the cushion member, or the like.

Therefore, the present invention is made in view of the problem that the conventional technology has, and objects thereof are to prevent the pipe from making a contact with the flexible member by contacting the pipe with the bendable opposite piece of the clamp main body made of the hard member at the time of mounting the pipe, and to allow the insertability of the pipe to improve.

Means for Solving the Problems

The present invention is made in order to achieve the aforementioned respective objects, and has the following characteristic.

First, a clamp has the following structure.

(1) Clamp Main Body

A clamp main body is made of a hard member (for example, a piece half portion)

(2) Flexible Member

A flexible member is provided in the clamp main body.

(3) Pipe Holding Portion

A pipe holding portion is provided in the flexible member, and can hold a pipe.

(4) Pipe Insertion Path

A pipe insertion path communicates one end portion with the pipe holding portion, and opens the other end portion outwardly.

(5) A Pair of Opposite Pieces

A pair of opposite pieces is provided in the clamp main body, and is positioned opposite each other by clamping the pipe insertion path.

Secondly, at least one opposite piece of the pair of opposite pieces, is pressed by an outer circumference of the pipe inserted into the pipe insertion path, and is bendable in a direction wherein the pipe insertion path is expandable.

Thirdly, one opposite piece extends up to a position adjacent to the pipe holding portion.

Fourthly, an extending end portion of one opposite piece protrudes toward an inside of the pipe insertion path from one portion of the flexible member adjacent to the end portion.

The present invention may also have the following characteristic.

Specifically, in the extending end portion of one opposite piece, there is formed a plane surface portion receiving a load in a removal direction acting on the pipe. Accordingly, by the plane surface portion of the bendable opposite piece, the load in the removal direction acting on the pipe can be received.

The present invention may also have the following characteristic.

First, the clamp main body is formed by assembling two pieces of the same members (for example, the piece half portion).

Secondly, the flexible member is held between two pieces of the members (for example, the piece half portion). Accordingly, by assembling two pieces of the same members, the clamp main body can be assembled, so that the members can be manufactured using one piece of mold. As a result, not only a mold cost can be controlled, but also types or numbers of parts can be reduced, so that an assembly is easy, and furthermore, a wrong assembly can be prevented.

The present invention may also have the following characteristic.

First, in the extending end portion of one opposite piece, there is provided a claw portion.

Secondly, in the flexible member, there is provided a depressed portion in which the claw portion fits in. Accordingly, by fitting the claw portion of the bendable opposite piece of the clamp main body into the depressed portion of the flexible member, the clamp main body and the flexible member can be easily and promptly assembled.

The present invention may also have the following characteristic.

Specifically, in the flexible member, there is formed a cut-out portion (for example, first and second cut-out portions) at least in a direction wherein one opposite piece bends. Accordingly, since the cut-out portion is formed in the flexible member in the direction wherein the bendable opposite piece bends, at a time of mounting the pipe, the hard member can be easily bent, and an insertability of the pipe can be improved further.

The present invention may also have the following characteristic.

Specifically, in the clamp main body, there is formed a pipe support portion extending toward the pipe insertion path. Accordingly, by forming the pipe support portion extending toward the pipe insertion path of the flexible member in the clamp main body, a displacement of a pipe can be prevented.

Consequently, a contact between the pipe and the clamp main body made of the hard member can be prevented.

Effect of the Invention

Since the present invention is structured as mentioned above, at the time of mounting the pipe, the bendable opposite piece of the clamp main body made of the hard member, and the pipe make a contact with each other so as to be capable of preventing the pipe from contacting with the flexible member, and capable of improving the insertability of the pipe. Also, at the time of mounting the pipe, by preventing the pipe from contacting with the flexible member, a failure such as peeling of the flexible member, and the like can be prevented.

BRIEF DESCRIPTION OF THE DRAWINGS

FIG. 19 is an exploded perspective view of the clamp.
FIG. 20 is a front view of the clamp.
FIG. 21 is a front view of a state wherein the piece half portion is removed from the clamp.
FIG. 22 is a left side view of the clamp.
FIG. 23 is a right side view of the clamp.
FIG. 24 is an exploded perspective view of the clamp.
FIG. 25 is a perspective view of a state wherein the clamp is assembled.
FIG. 26 is a front view of the clamp.
FIG. 27 is a right side view of the clamp.
FIG. 28 is a plan view of the clamp.
FIG. 29 is a bottom view of the clamp.
FIG. 30 is an explanatory view of the attachment state of the clamp.
FIG. 31 is a front view of the piece half portion.
FIG. 32 is a left side view of the piece half portion.
FIG. 33 is a rear view of the piece half portion.
FIG. 34 is a plan view of the piece half portion.
FIG. 35 is a bottom view of the piece half portion.
FIG. 36 is a front view of the flexible member.
FIG. 37 is a right side view of the flexible member.
FIG. 38 is a plan view of the flexible member.
FIG. 39 is a cross-sectional view taken along a line B to B in FIG. 36.
FIG. 40 is a cross-sectional view taken along a line C to C in FIG. 38.

BEST MODES OF CARRYING OUT THE INVENTION (First Embodiment)
First, the first embodiment of the present invention will be explained using FIGS. 1 to 18.
In FIGS. 1 to 6, the reference numeral 10 represents a clamp, and as shown in FIG. 6, the present clamp 10 holds a pipe 20, and also includes an anti-vibration function.
Specifically, although it is not shown in the drawings, the clamp 10 is disposed inside, for example, an engine compartment (an engine room) of an automobile, and includes a function of an anti-vibration (a vibration control) for making a vibration from a compressor of an air conditioner difficult to transmit to a body from the pipe 20 such as the air conditioner and the like.
As shown in FIG. 6, the clamp 10 is fixed to a panel 30. In the panel 30, there is provided an attachment hole 31 passing through up and down. Although it is not shown in the drawings, the attachment hole 31 is formed in a non-circular shape, for example, in an oval shape.
Incidentally, although the oval shape is shown as an example of the attachment hole 31, the attachment hole 31 may also have a shape of an ellipse, a square shape, and the like provided that the attachment hole 31 has the non-circular shape.
As shown in FIG. 6, in panels 30 and 30a, there are two kinds with a different thickness. Of the panels 30 and 30a, one panel 30 is formed relatively thinly, and the other panel 30a is formed thick.
Specifically, the clamp 10 is structured broadly by the following parts.
Incidentally, the following (1) and (2) will be described later.
(1) Clamp Main Body 40
(2) Flexible Member 50
Incidentally, the parts of the clamp 10 are not limited to the aforementioned (1) and (2).
(Clamp Main Body 40)
The clamp main body 40 is made of a hard member.
Specifically, as shown in FIG. 1, the clamp main body 40 is formed by assembling two pieces of the same members, i.e., piece half portions 41 and 42. The later-mentioned flexible member 50 is held between two pieces of the piece half portions and 42 by clamping the flexible member 50 in a sandwich manner.
Although it is not shown in the drawings, two pieces of the piece half portions 41 and 42 are the same parts molded by one mold, and are integrally molded by thermoplastic resin having moderate elasticity and rigidity such as, for example, POM (polyacetal resin) and the like.

The clamp main body 40 broadly comprises the following parts.

Incidentally, the following (1) and (2) will be described later.

(1) Frame Bodies 60
(2) Support Legs 70

Incidentally, each part of the clamp main body 40 is not limited to the aforementioned (1) and (2).

(Flexible Member 50)

Figure 1:
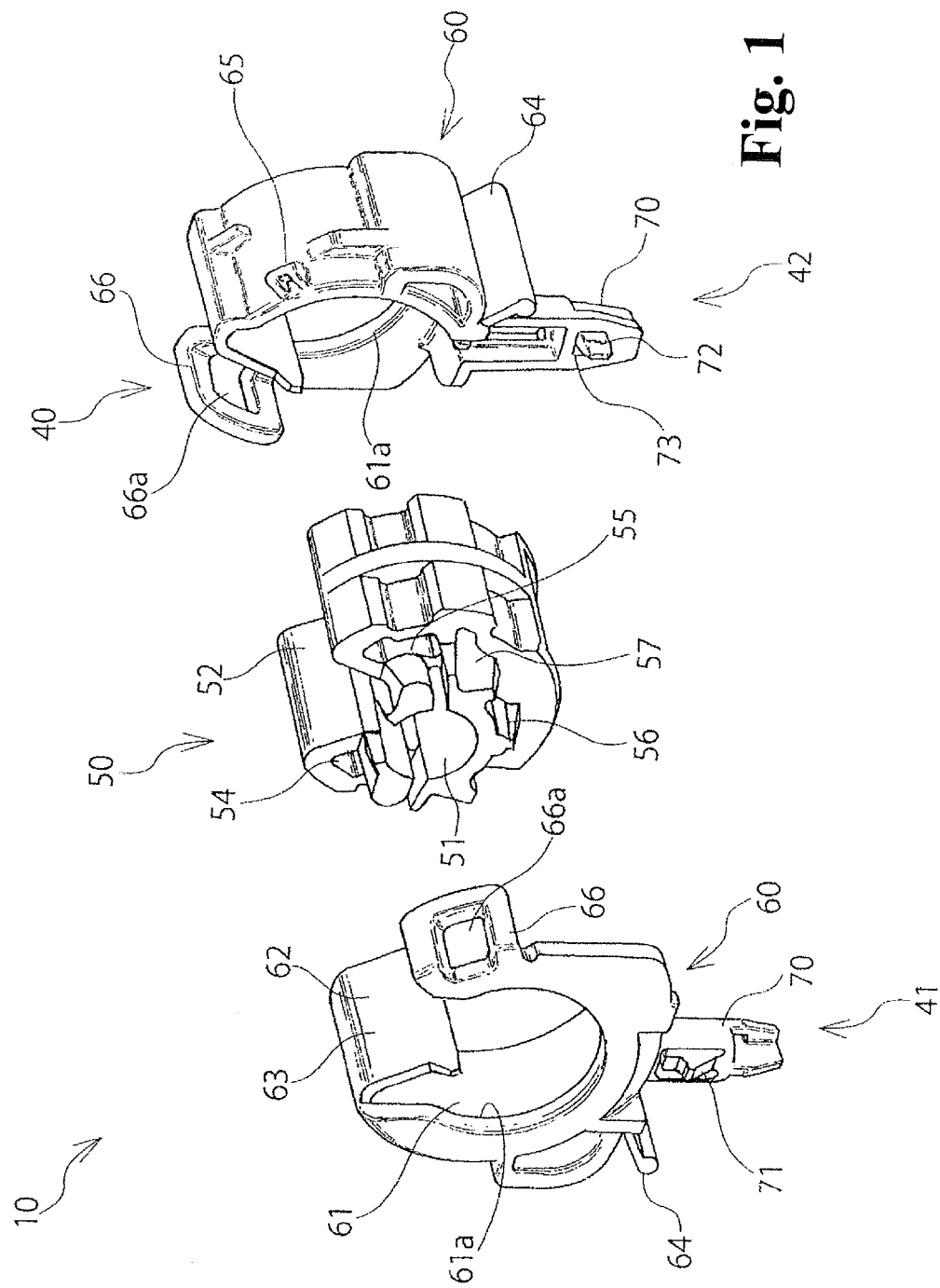
FIG. 1 is an exploded perspective view of a clamp according to the first embodiment of the present invention.

As shown in FIG. 1, the flexible member 50 is provided in the clamp main body.

Specifically, the flexible member 50 is integrally molded by thermoplastic resin such as flexible resin more flexible than the clamp main body 40, for example, TPO (olefinic elastomer) and the like.

The flexible member 50 broadly comprises the following parts.

Incidentally, each part of the flexible member 50 is not limited to the following (1) to (4).

(1) Pipe Holding Portion 51

As shown in FIGS. 1, 2, 6, and 12, a pipe holding portion 51 is provided in the flexible member 50, and can hold the pipe 20.

Specifically, the pipe holding portion 51 is formed in a C shape, and an internal diameter thereof is set smaller than an external diameter of the pipe 20.

(2) Pipe Insertion Path 52

As shown in FIGS. 1, 2, 6, and 12, a pipe insertion path 52 communicates one end portion with the pipe holding portion 51, and the other end portion opens outwardly.

Specifically, the pipe insertion path 52 is positioned above the pipe holding portion 51, and a groove width thereof is set smaller than the external diameter of the pipe 20.

(3) Depressed Portions 53

Figure 2:
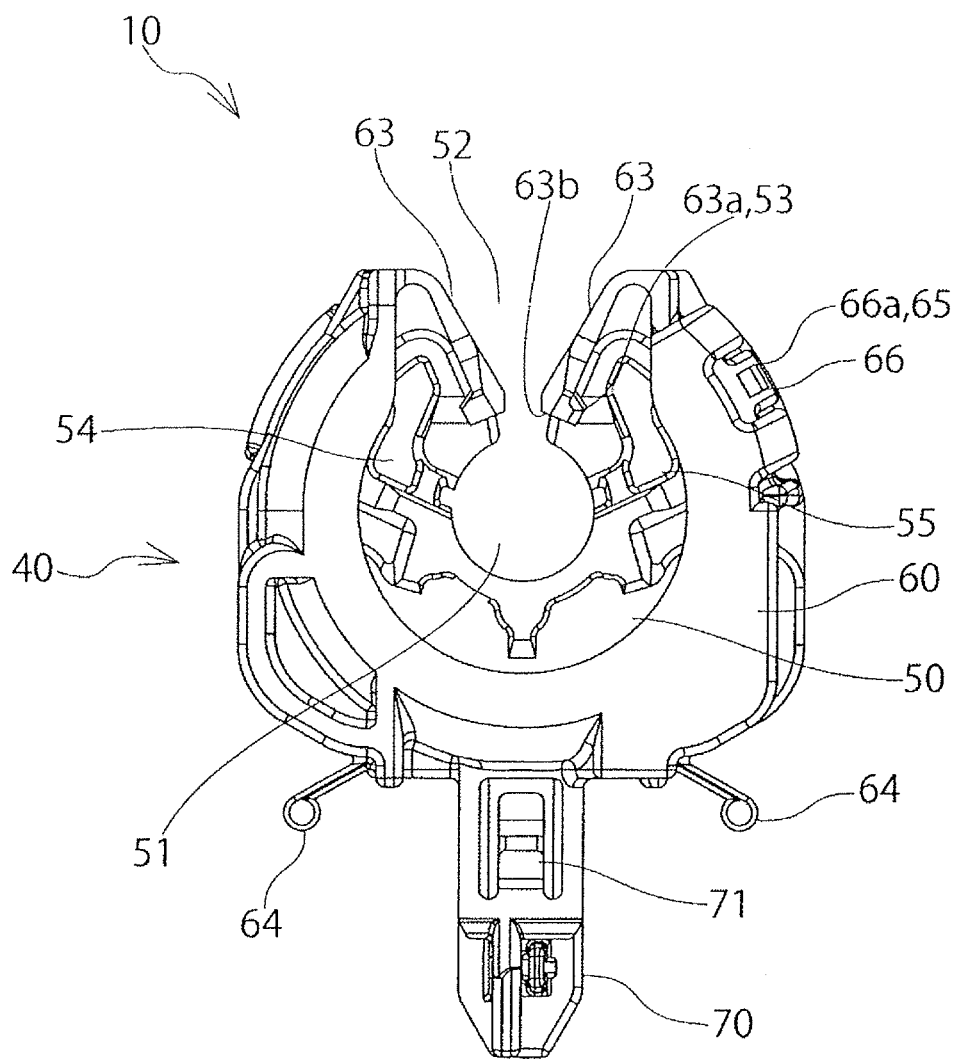
FIG. 2 is a front view of the clamp.
Figure 16:
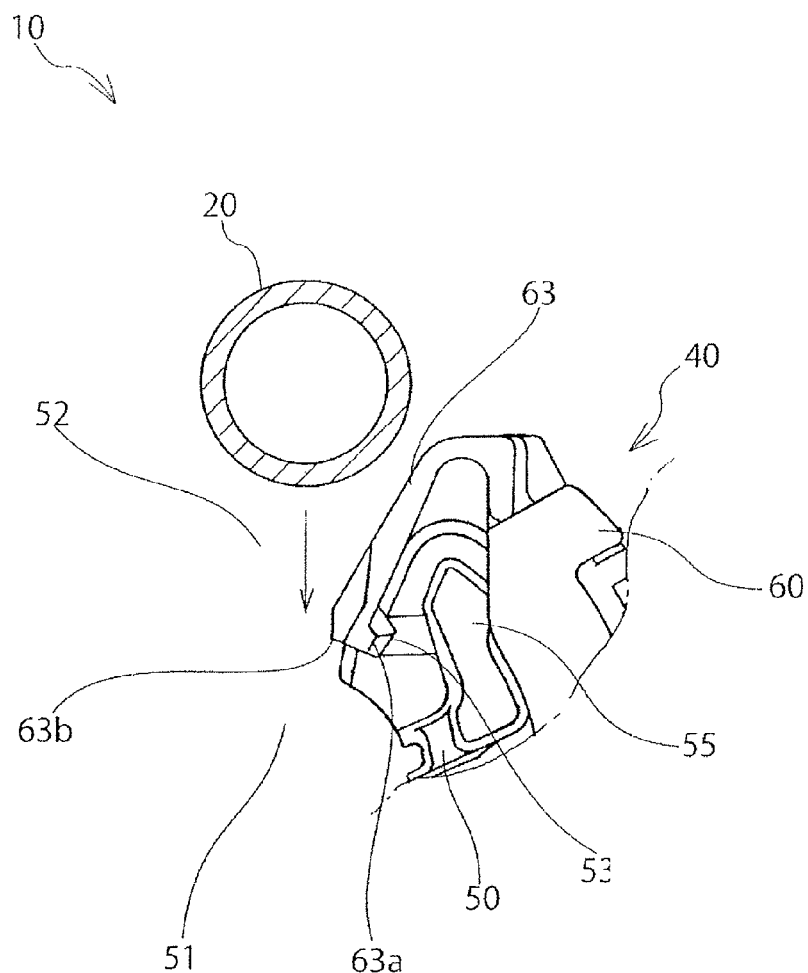
FIG. 16 is an explanatory view at a time of inserting a pipe according to the first embodiment of the present invention.

As shown in FIGS. 2 and 16, depressed portions 53 are provided in the flexible member 50, and claw portions 63a of the later-mentioned opposite pieces 63 of the clamp main body 40 fit in.

Specifically, the depressed portions 53 are formed as a right-and-left pair by clamping the pipe insertion path 52, are positioned in a middle of a length of the pipe insertion path 52, and opens toward the pipe insertion path 52.

(4) First to Fourth Cut-Out Portions 54 to 57

Figure 12:
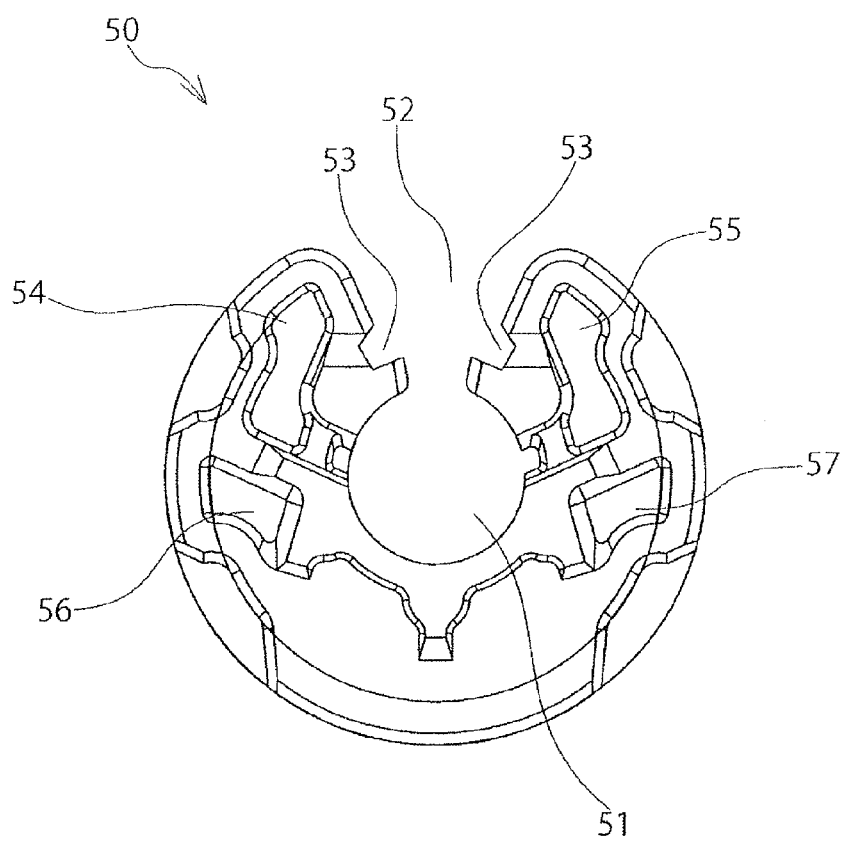
FIG. 12 is a front view of a flexible member according to the first embodiment of the present invention.
Figure 13:
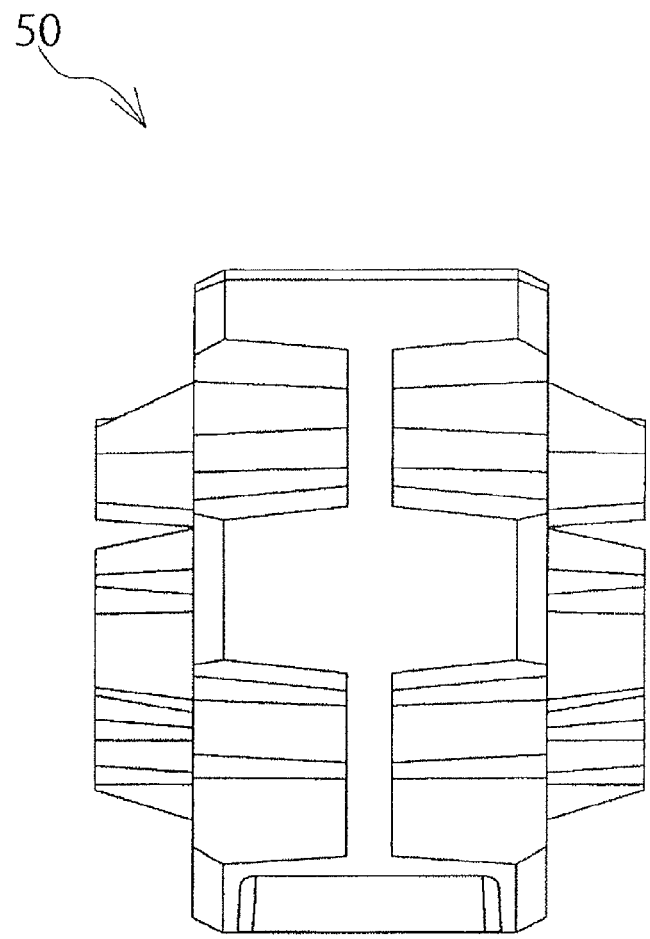
FIG. 13 is a side view of the flexible member.
Figure 14:
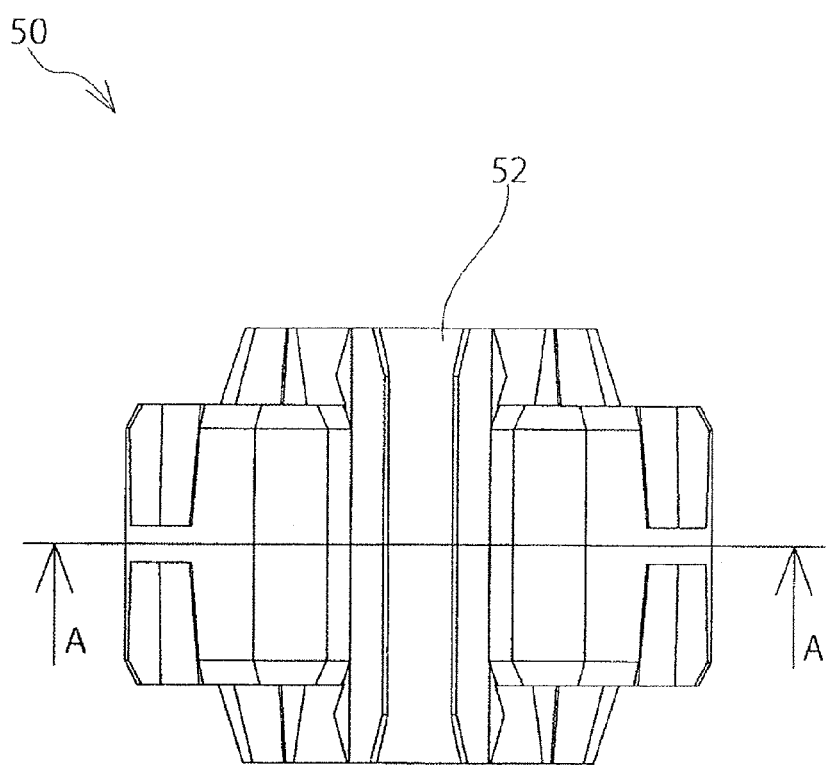
FIG. 14 is a plan view of the flexible member.
Figure 15:
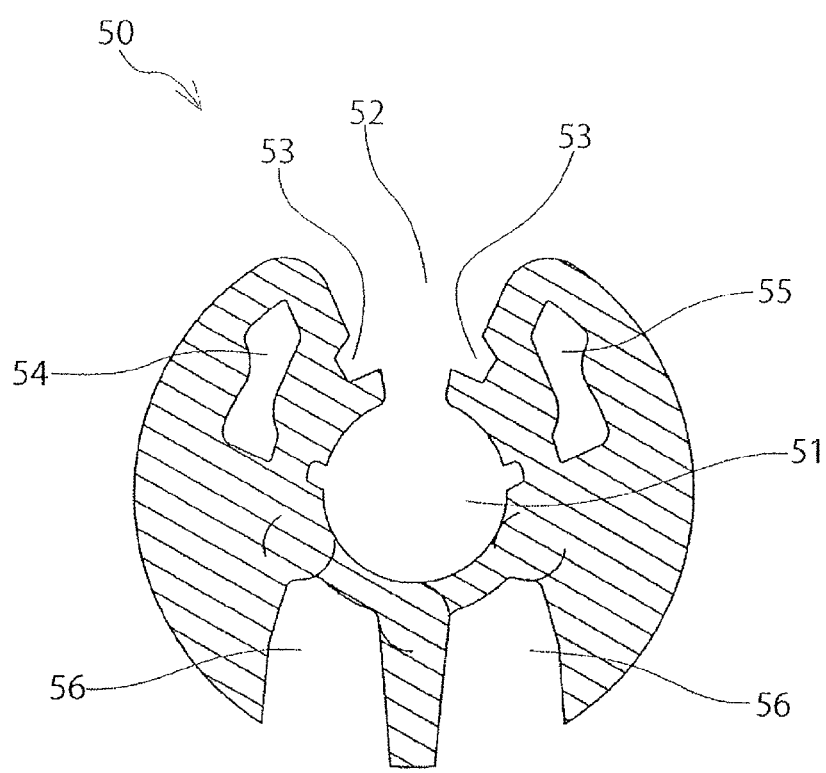
FIG. 15 is a cross-sectional view taken along a line A to A in FIG. 14.

As shown in FIGS. 1, 2, and 12, first to fourth cut-out portions 54 to 57 are for allowing the flexible member 50 to be easily bent, and are formed with a plural number, for example, four pieces, in a hole shape passing through in a thickness direction of the flexible member 50.

Incidentally, although the hole shape is shown as an example of the cut-out portions 54 to 57, the cut-out portions 54 to 57 are not limited to the hole shape, and may be a depressed shape whose one end is closed.

Specifically, among four pieces of the first to fourth cut-out portions 54 to 57, as shown in FIGS. 1, 2, and 12, two pieces of the first and second cut-out portions 54 and 55 are positioned in a direction where the opposite pieces 63 bend.

As shown in FIGS. 1, 2, and 12, the remaining two pieces of the third and fourth cut-out portions 56 and 57 are respectively positioned below the first and second cut-out portions 54 and 55, and are positioned by being opposed to each other in a diametrical direction of the pipe holding portion 51.

(Frame Bodies 60)

The frame bodies 60 hold the pipe 20, and are formed in a C shape whose upper surface is open.

Specifically, the frame bodies 60 comprise the respective following parts.

Incidentally, (1) to (6) will be described later.

(1) Hollow Portion 61
(2) Opening Portion 62
(3) Opposite Pieces 63
(4) Elastic Arms 64
(5) Lock Claw 65
(6) Lock Piece 66

Incidentally, each portion of the frame bodies 60 is not limited to the aforementioned (1) to (6).

(Support Legs 70)

As shown in FIGS. 1 to 3, 5, and 6, the support legs 70 hang from the frame bodies 60, and support the frame bodies 60 in the panel 30.

Specifically, the support legs 70 comprise the respective following parts.

Incidentally, each part of the support legs 70 is not limited to the following (1) to (3).

(1) Elastic Claws 71

As shown in FIGS. 1 to 3, 5, and 6, elastic claws 71 respectively protrude from mutually back-to-back side surfaces of the support legs 70, and are formed as a pair. Each elastic claw 71 is pressed by an inner edge of the attachment hole 31 of the panel 30, and is bent toward an inside of the support legs 70 so as to reduce a diameter. After passing through the attachment hole 31, each elastic claw 71 restores its original state by an elastic restoring force of the resin, and abuts against a back surface (a lower surface) of the panel 30. Consequently, each elastic claw 71 clamps the panel 30 between the later-mentioned right-and-left pair of elastic arms 64 of the frame bodies 60 from front and back surfaces (upper and lower surfaces), so that the clamp main body 40 is fixed relative to the attachment hole 31 of the panel 30.

Figure 5:
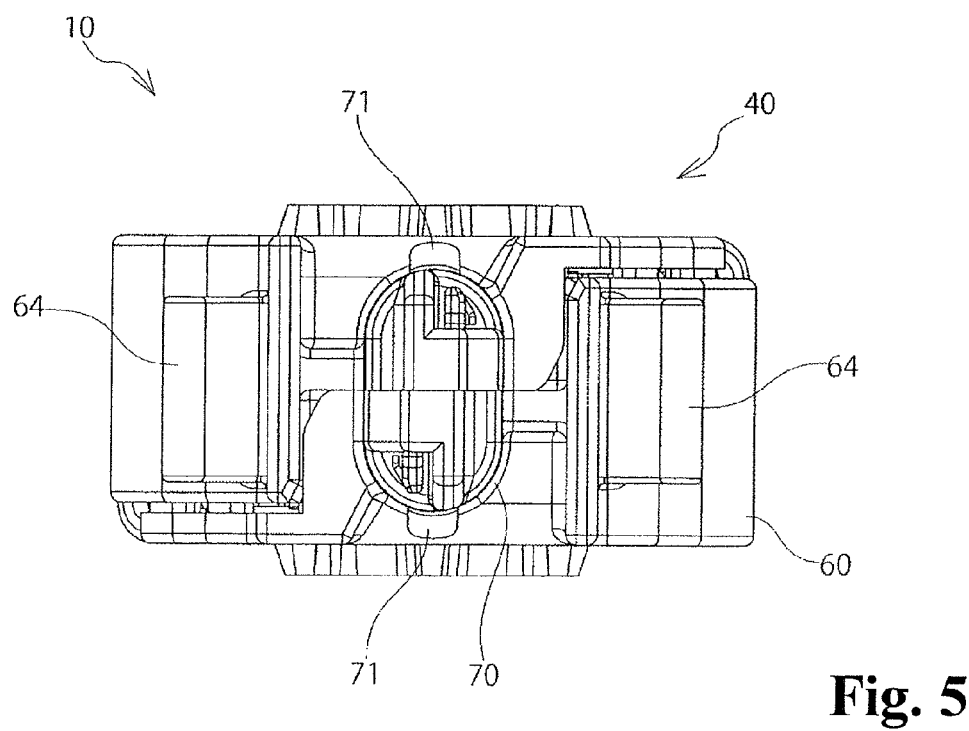
FIG. 5 is a bottom view of the clamp.

Incidentally, the pair of elastic claws 71 protrudes in a top-and-bottom direction in FIG. 5. On the other hand, the pair of elastic arms 64 protrudes in an orthogonal direction, i.e., a right-and-left direction in the same figure.

(2) Positioning Projections 72

Figure 7:
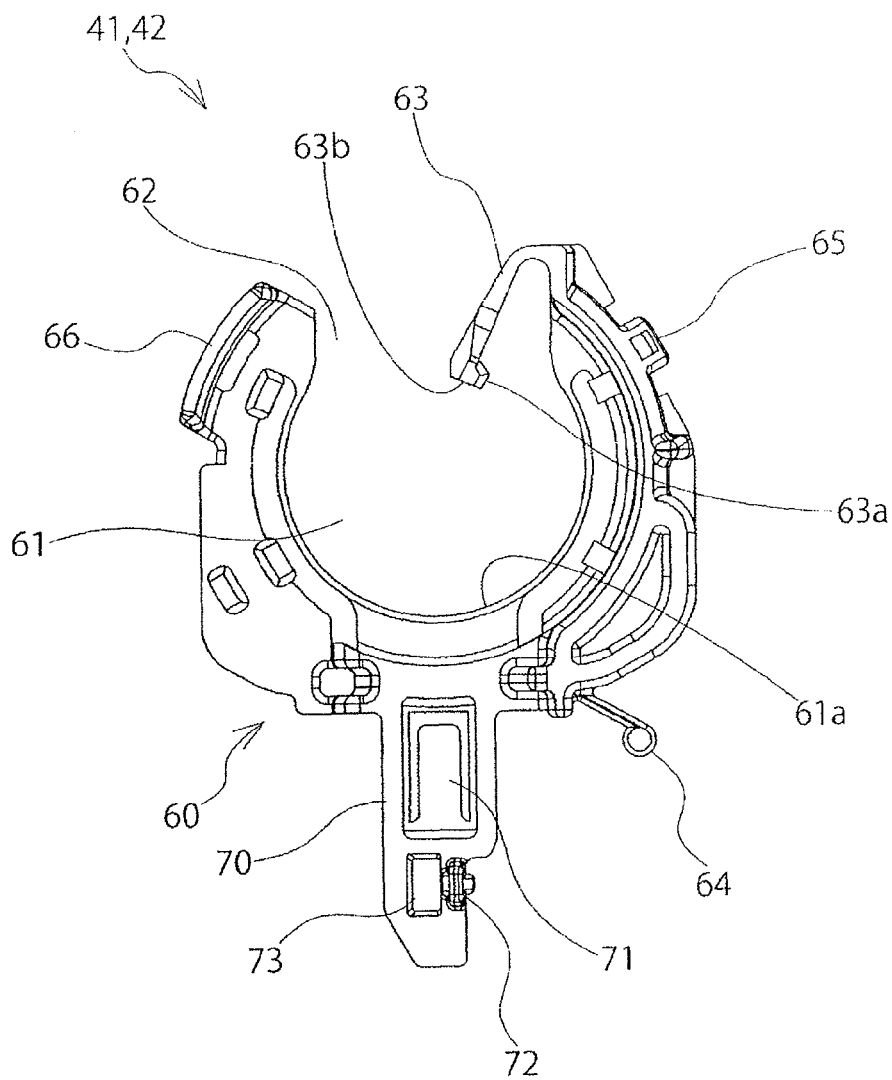
FIG. 7 is a front view of a piece half portion according to the first embodiment of the present invention.
Figure 8:
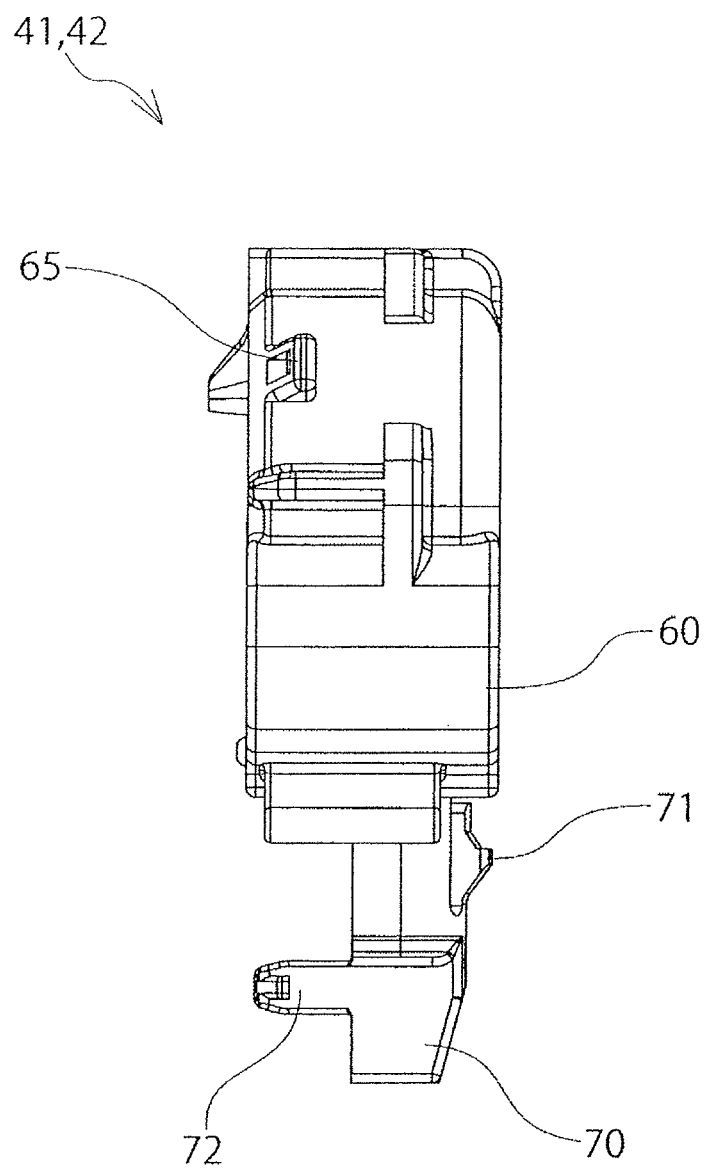
FIG. 8 is a side view of the piece half portion.

As shown in FIGS. 1, 7, and 8, positioning projections 72 are respectively positioned on matching surfaces of two pieces of the piece half portions 41 and 42, and protrude from one matching surface of the piece half portion 41 or 42 toward the other matching surface of the piece half portion 41 or 42 in a piece shape.

(3) Positioning Holes 73

As shown in FIGS. 1, 7, and 8, positioning holes 73 are adjacent to the positioning projections 72, are respectively positioned on the matching surfaces of two pieces of the piece half portions 41 and 42, and are formed in the hole shape. In the positioning hole 73 formed in one matching surface of the piece half portion 41 or 42, there is fitted the positioning projection 72 protruding from the other matching surface of the piece half portion 41 or 42.

(Hollow Portion 61)

As shown in FIGS. 1 and 7, the hollow portion 61 is formed in an inner side surrounded by an inner circumference of the C-shaped frame body 60, and the flexible member 50 fits in.

As shown in FIG. 1, in the hollow portion 61, there is formed a pair of projecting edge portions 61a positioned on both sides of the thickness direction of the hollow portion 61 thereof, and curved along the inner circumference of the C-shaped frame body 60. As shown in FIG. 2, a height of the projecting edge portions 61*a* is set lower than a thickness of the flexible member 50.

Consequently, as shown in FIG. 2, when the flexible member 50 is fitted into the hollow portion 61, one portion of the flexible member 50 protrudes toward the center of the hollow portion 61 from an inner circumferential edge of the projecting edge portions 61*a*.

In the present embodiment, as shown in FIG. 1, the pair of projecting edge portions 61*a* is formed in two pieces of the piece half portions 41 and 42 one by one. When both the piece half portions 41 and 42 are assembled by matching face to face, the projecting edge portions 61*a* of two pieces of the piece half portions 41 and 42 are positioned on both sides in the thickness direction of the flexible member 50.

Then, on the inner side surrounded by the pair of projecting edge portions 61*a* and the inner circumferences of the frame bodies 60, there are formed grooves having a cross-sectional surface of a C shape which are not shown in the drawings, and the flexible member 50 is held inside the grooves.

(Opening Portion 62)

As shown in FIGS. 1 and 7, the opening portion 62 communicates one end portion with the hollow portion 61, and opens the other end portion outwardly. In the opening portion 62, there is positioned the pipe insertion path 52 of the flexible member 50.

(Opposite Pieces 63)

As shown in FIGS. 1, 2, 6, and 16 to 18, the pair of opposite pieces 63 is provided in the clamp main body 40, and is positioned opposite each other by clamping the pipe insertion path 52 of the flexible member 50.

Figure 17:
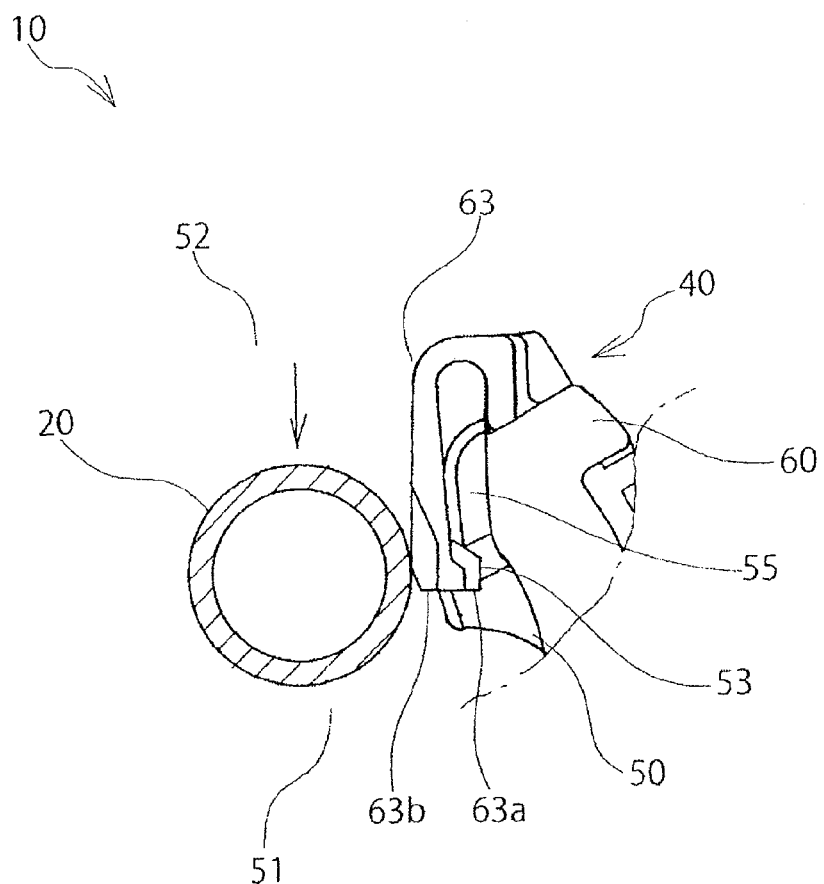
FIG. 17 is an explanatory view in the course of inserting the pipe.
Figure 18:
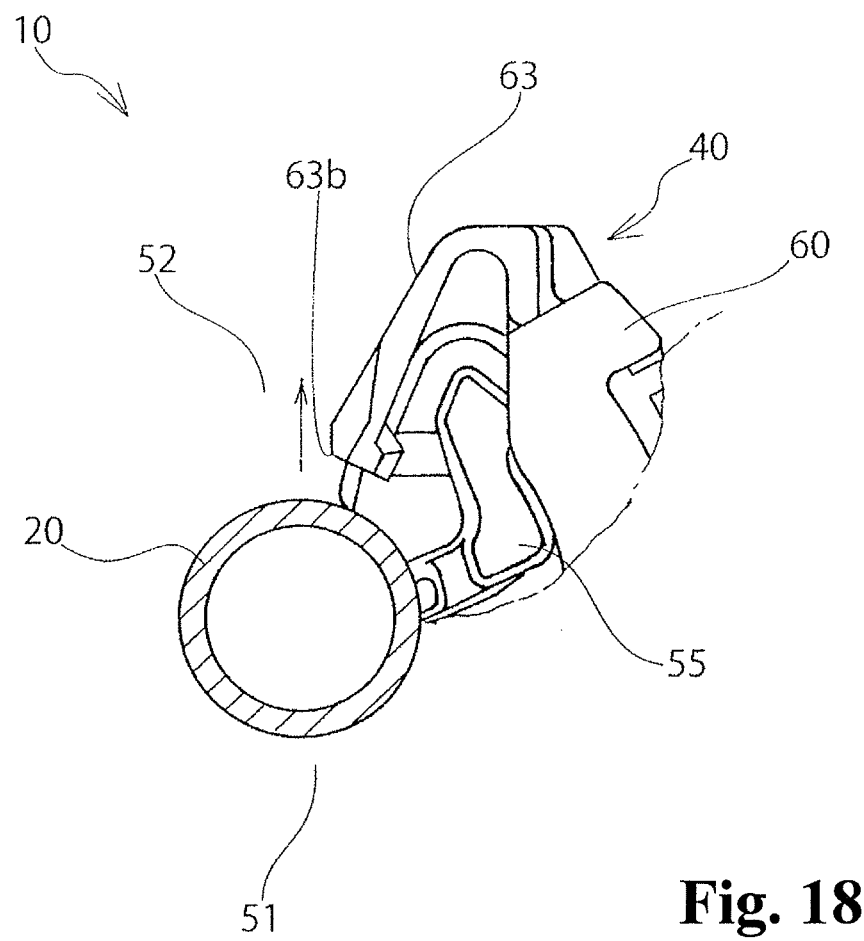
FIG. 18 is an explanatory view in a case where a force in a falling-out direction acts on the pipe.
Figure 19:
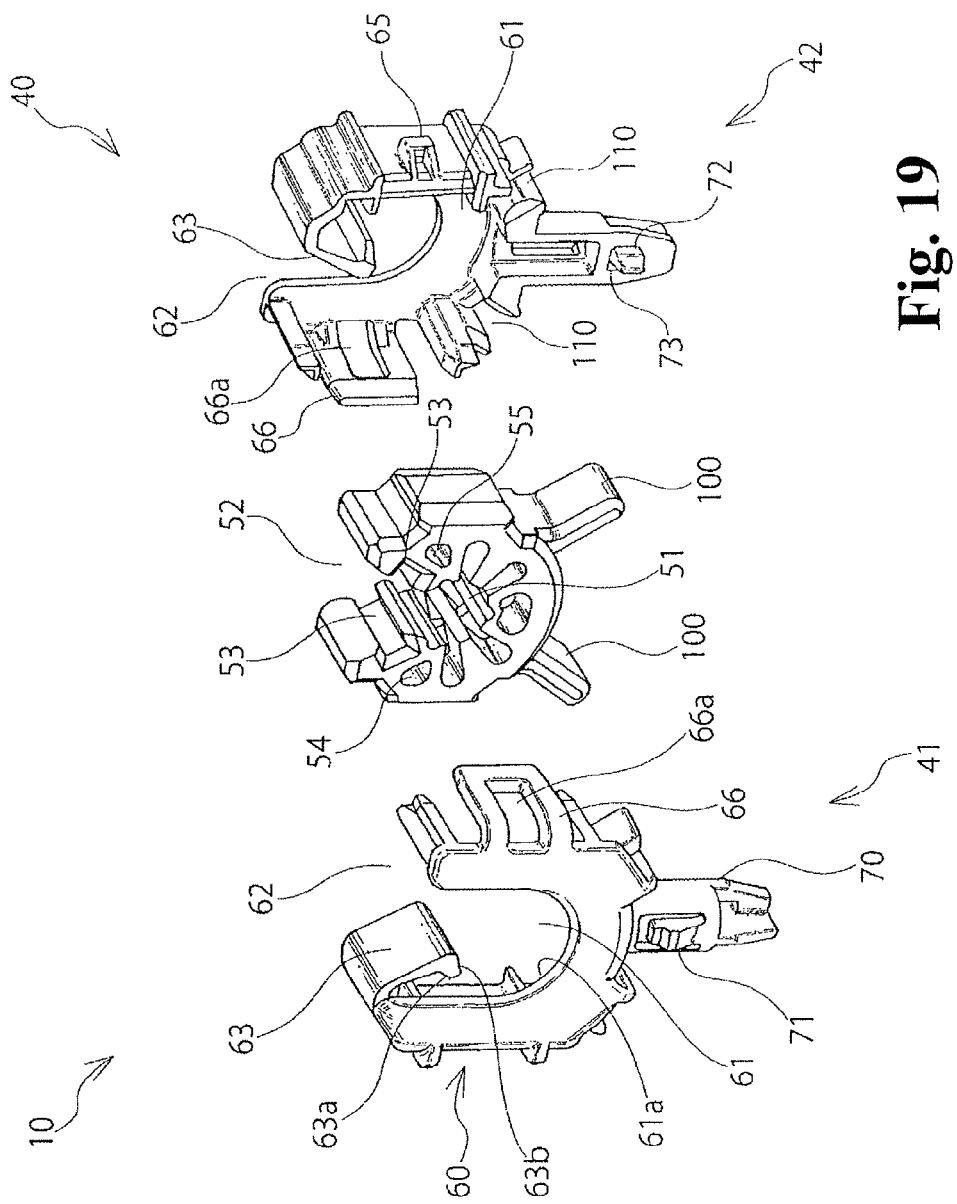
FIGS. 19 to 23 show a second embodiment of the present invention.
Figure 20:
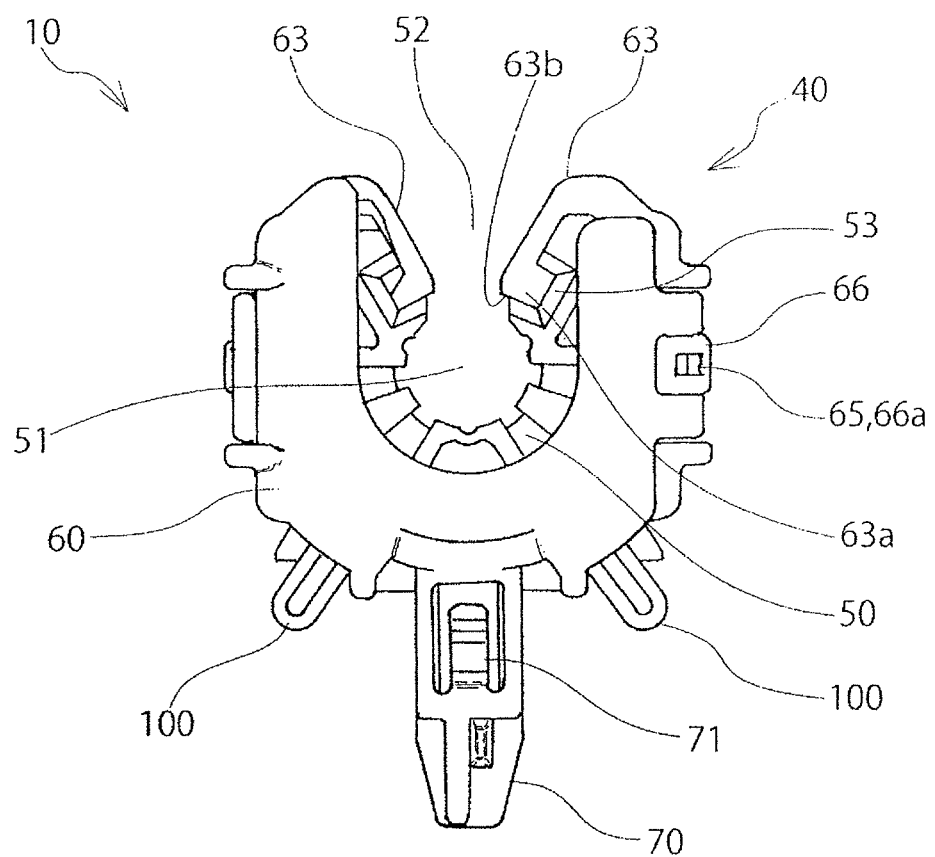
Figure 21:
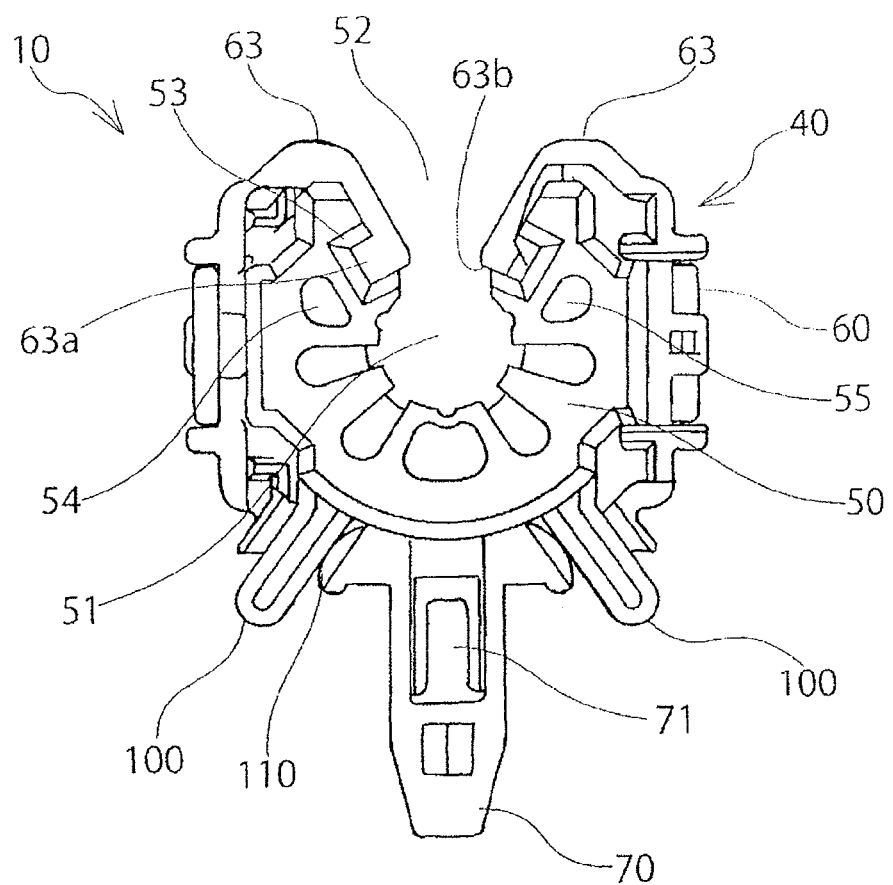
Figure 22:
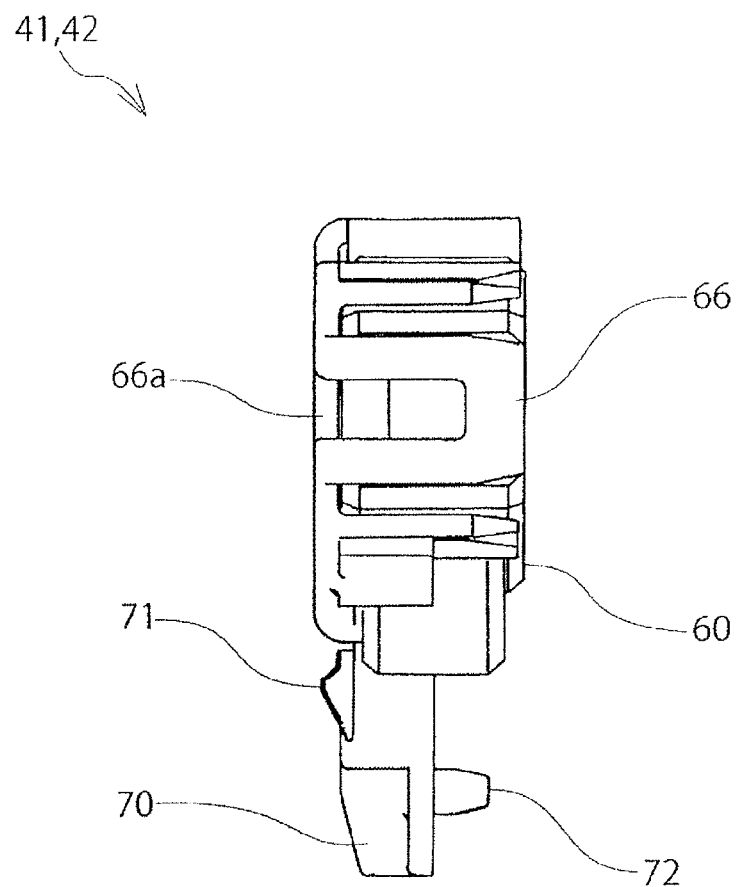
Figure 23:
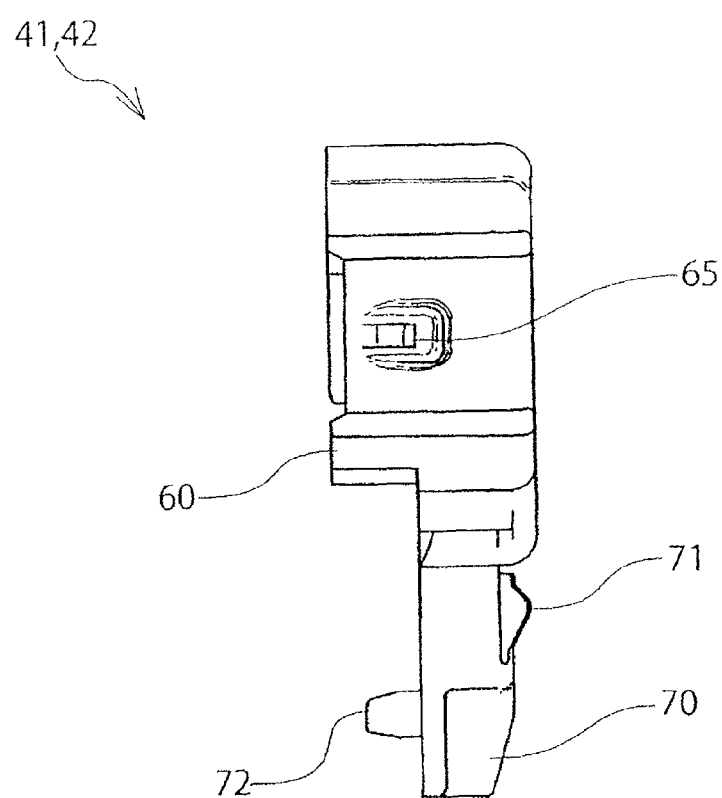

At least one opposite piece 63 of the pair of opposite pieces 63, or in the present embodiment, both of the opposite pieces 63, are pressed by an outer circumference of the pipe 20 inserted into the pipe insertion path 52 as shown in FIGS. 16 to 18, and are bendable in a direction wherein the pipe insertion path 52 is expandable.

Incidentally, although both the opposite pieces 63 are bendable, the opposite pieces 63 are not limited to the above, and only one opposite piece 63 may be bendable.

One opposite piece 63, in the present embodiment, both the opposite pieces 63, extend up to a position adjacent to the pipe holding portion 51 of the flexible member 50, i.e., downwardly, as shown in FIGS. 1, 2, 6, and 16 to 18.

One opposite piece 63, in the present embodiment, extending end portions of both the opposite pieces 63, i.e., lower end portions of both the opposite pieces 63, protrude toward an inside of the pipe insertion path 52 from one portion of the flexible member 50 adjacent to the end portions as shown in FIGS. 2 and 16.

In the present embodiment, as shown in FIGS. 1 and 7, the pair of opposite pieces 63 is formed in two pieces of the piece half portions 41 and 42 one by one. As shown in FIG. 2, when both the piece half portions 41 and 42 are assembled by matching face to face, the opposite pieces 63 of two pieces of the piece half portions 41 and 42 are positioned on both right and left sides in a width direction of the pipe insertion path 52 of the flexible member 50.

As shown in FIG. 2, both the opposite pieces 63 obliquely slope in a "V" shape in such a way that the groove width of the pipe insertion path 52 of the flexible member 50 is narrowed toward the pipe holding portion 51.

Specifically, as shown in FIGS. 1, 2, 6, and 16 to 18, each opposite piece 63 respectively comprises the respective following parts.

Incidentally, each part of the opposite piece 63 is not limited to the following (1) and (2).

(1) Claw Portion 63*a*

As shown in FIGS. 2 and 16, the claw portion 63*a* is positioned in the extending end portion, i.e., the lower end portion of the opposite piece 63, and bends in an L shape toward the flexible member 50. The claw portion 63*a* fits into the depressed portion 53 of the flexible member 50.

(2) Plane Surface Portion 63*b*

As shown in FIGS. 2 and 16, a plane surface portion 63*b* is positioned in the extending end portion, i.e., the lower end portion of the opposite piece 63, and receives a load in a removal direction acting on the pipe 20.

(Elastic Arms 64)

As shown in FIGS. 1, 6, 7, and 10, the right-and-left pair of elastic arms 64 protrudes obliquely downward from both right and left sides of the lower end portion of the frame body 60.

Figure 6:
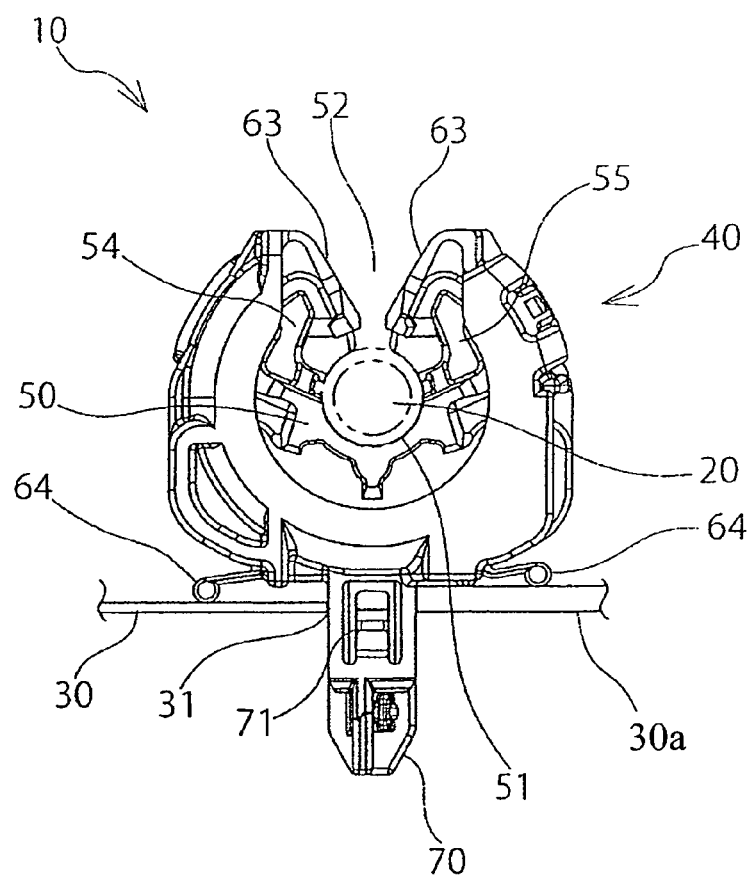
FIG. 6 is an explanatory view of an attachment state of the clamp.

As shown in FIG. 6, when the support leg 70 is inserted into the attachment hole 31 of the panel 30, and is attached, the right-and-left elastic arms 64 elastically abut against a front surface (an upper surface) of the panel 30. The right-and-left elastic arms 64 are elastically abutted against the front surface (the upper surface) of the panel 30 so as to allow a change of the thickness of the panels 30 and 30*a*.

Incidentally, the pair of elastic arms 64 protrudes in the right-and-left direction in FIG. 5. In contrast to this, the pair of elastic claws 71 protrudes in the orthogonal direction, i.e., the top-and-bottom direction in the same figure.

In the present embodiment, as shown in FIGS. 1 and 7, the right-and-left elastic arms 64 are formed in two pieces of the piece half portions 41 and 42 one by one. As shown in FIG. 2, when both the piece half portions 41 and 42 are matched face to face and are assembled, the elastic arms 64 of two pieces of the piece half portions 41 and 42 are positioned on both right and left sides.

(Lock Claws 65)

As shown in FIGS. 1 to 4, and 7 to 9, the lock claws 65 respectively protrude from outer circumferences of the frame bodies 60 of the piece half portions 41 and 42. As shown in FIGS. 1 to 4, the lock claw 65 formed in one piece half portion 41 or 42 is fitted into a lock hole 66*a* of the later-mentioned lock piece 66 formed in the other piece half portion 41 or 42, so that the lock claws 65 mutually fix both the piece half portions 41 and 42.

(Lock Pieces 66)

As shown in FIGS. 1 to 4, and 7 to 9, the lock pieces 66 are respectively formed on the outer circumferences of the frame bodies 60 of the piece half portions 41 and 42, and when the piece half portions 41 and 42 are matched face to face, the lock pieces 66 are positioned line-symmetrically to the lock claws 65.

The lock pieces 66 extend up and down from one of the piece half portion 41 or 42 toward the other of the piece half portion 41 or 42 in a thin plate manner.

Specifically, as shown in FIGS. 1 to 4, and 7 to 9, the lock pieces 66 comprise the following part.

Incidentally, the part of the lock pieces 66 is not limited to the following (1).

(1) Lock Holes 66*a*

As shown in FIGS. 1 to 4, and 7 to 9, the lock holes 66*a* pass through above and below the lock pieces 66, and are formed in a square shape.

Incidentally, although the square shape is shown as an example of the shape of the lock holes 66*a*, the shape of the lock holes 66*a* is not limited to the above, and may be a shape in which the lock claws 65 fit in.

Figure 9:
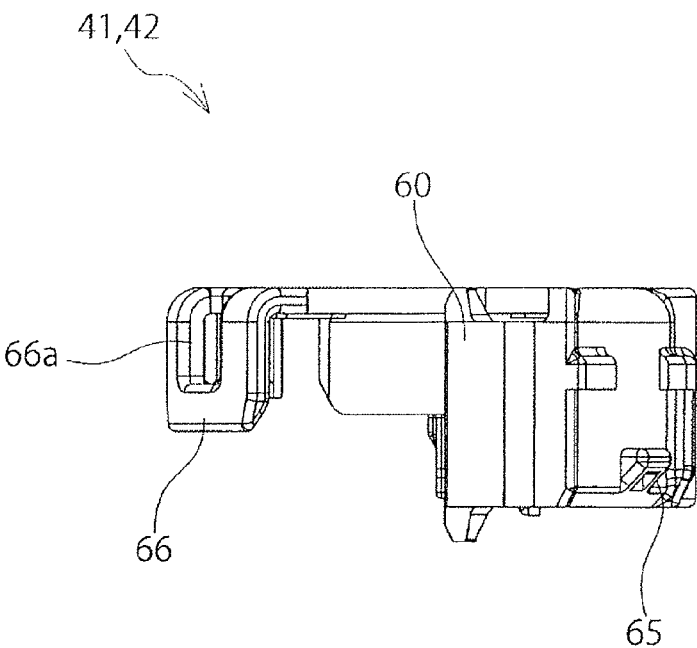
FIG. 9 is a plan view of the piece half portion.
Figure 10:
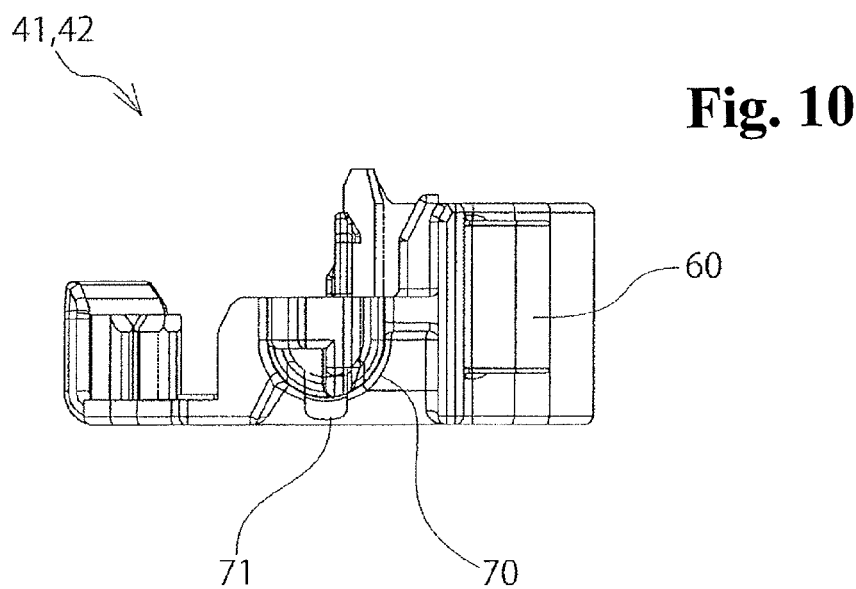
FIG. 10 is a bottom view of the piece half portion.
Figure 11:
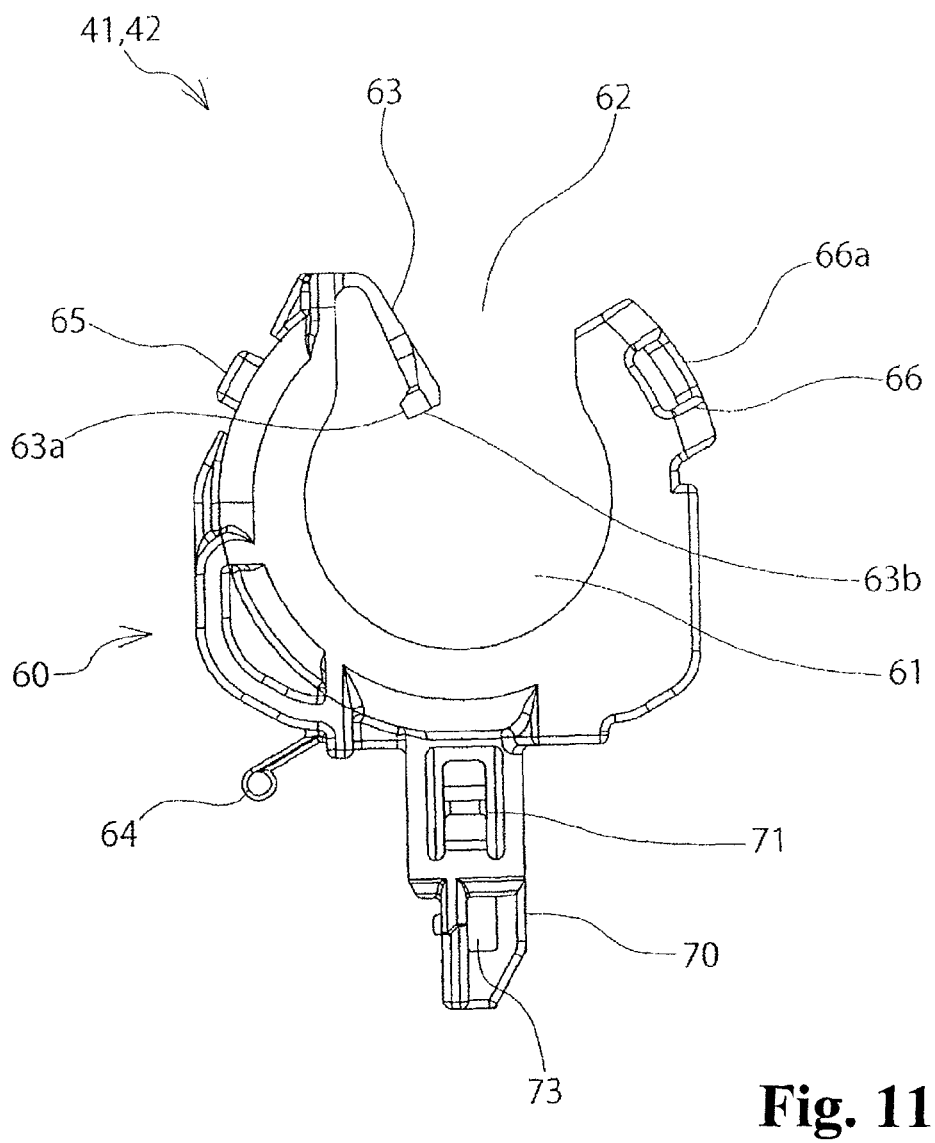
FIG. 11 is a rear view of the piece half portion.

As shown in FIGS. 7 to 9, the lock claw 65 formed in the other piece half portion 41 or 42 is fitted into the lock hole 66a formed in one piece half portion 41 or 42, so that the lock holes 66a mutually fix both the piece half portions 41 and 42.

(Assembly Method of Clamp 10)

Next, an assembly method of the clamp 10 comprising the aforementioned structure will be explained.

As shown in FIG. 1, the flexible member 50 is positioned between two pieces of the piece half portions 41 and 42 which are the same parts, and the piece half portions 41 and 42 are mutually matched face to face so as to assemble the clamp 10.

As shown in FIG. 16, when the flexible member 50 is fitted into the hollow portion 61 between both the piece half portions 41 and 42, the claw portion 63a of the piece half portion 41 is fitted into the depressed portion 53 of the flexible member 50. The claw portion 63a of each piece half portion 41 or 42 respectively is fitted into the right-and-left pair of depressed portions 53 of the flexible member 50, so that a movement of the flexible member 50 inside the hollow portion 61 is blocked.

Also, two pieces of the piece half portions 41 and 42 are mutually matched face to face in such a way that one positioning projection 72 of the piece half portion 41 or 42 fits into the other positioning hole 73.

Figure 3:
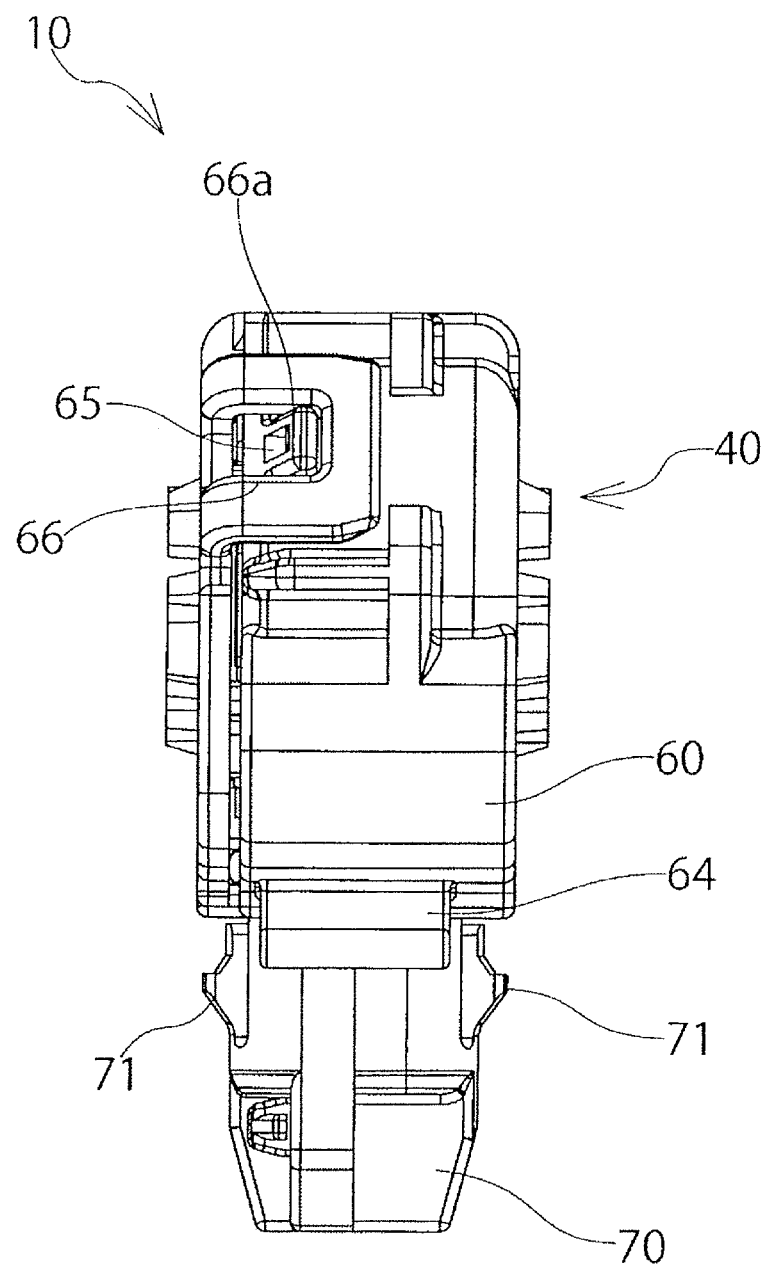
FIG. 3 is a side view of the clamp.
Figure 4:
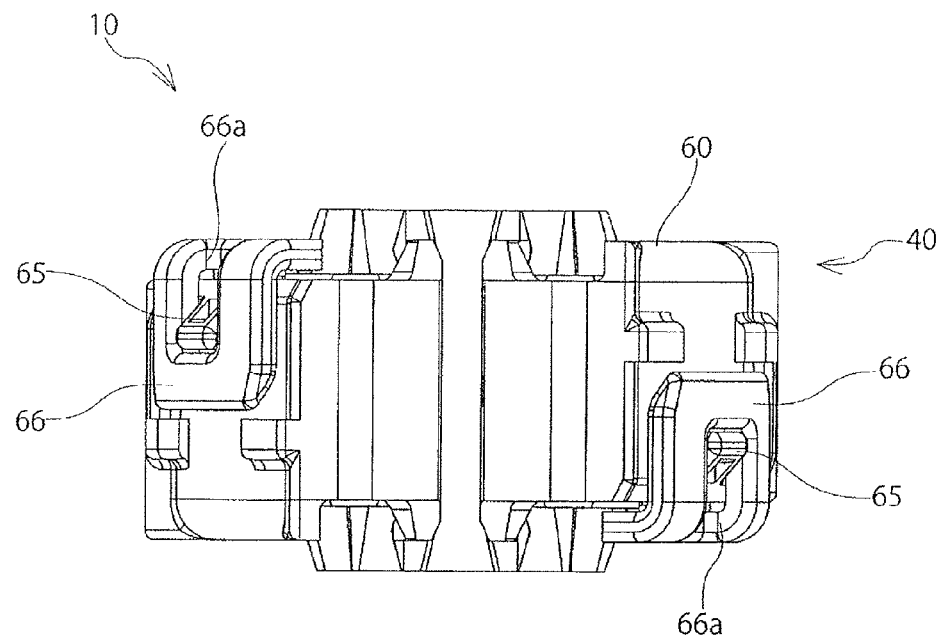
FIG. 4 is a plan view of the clamp.

Next, when two pieces of the piece half portions 41 and 42 are matched face to face, the lock claws 65 and the lock pieces 66 are mutually abutted. Here, when the piece half portions 41 and 42 are strongly matched face to face, the lock pieces 66 are pressed by the lock claws 65, and are pressed up so as to bend upward, so that the lock pieces 66 climb over the lock claws 65. When the lock pieces 66 climb over the lock claws 65, and positions of the lock holes 66a and the lock claws 65 are matched, the lock pieces 66 restore its original state by the elastic restoring force of the resin, so that as shown in FIG. 3, the lock claws 65 fit into the lock holes 66a.

One lock claw 65 of each piece half portion 41 or 42 respectively fits into the other respective lock hole 66a, so that in a state wherein the flexible member 50 is clamped in the sandwich manner, both the piece half portions 41 and 42 are mutually fixed.

(Usage Method of Clamp 10)

Next, a usage method of the clamp 10 in an assembled state will be explained.

The pipe 20 may be attached to the pipe holding portion 51 of the clamp 10, and after that, the support legs 70 may be attached to the panel 30, or the support legs 70 may be attached to the panel 30 beforehand, and after that, the pipe 20 may be also attached to the pipe holding portion 51. Hereinafter, the latter procedure will be explained.

First, the support legs 70 of the clamp 10 are matched to and inserted into the attachment hole 31 of the panel 30.

When the support legs 70 are inserted into the attachment hole 31, the pair of elastic claws 71 is pressed by the inner edge of the attachment hole 31 of the panel 30, and is bent toward the inside of the support legs 70, so that the external diameter of the support legs 70 decreases. After passing through the attachment hole 31, each elastic claw 71 restores its original state by the elastic restoring force of the resin, and as shown in FIG. 6, the elastic claw 71 abuts against the back surface (the lower surface) of the panel 30.

Consequently, each elastic claw 71 clamps the panel 30 between the later-mentioned right-and-left pair of elastic arms 64 of the frame bodies 60 from the front and back surfaces (the upper and lower surfaces), so that the clamp main body 40 is fixed relative to the attachment hole 31 of the panel 30.

Also, at that time, as shown in FIG. 6, the right-and-left elastic arms 64 elastically abut against the front surface (the upper surface) of the panel 30. The right-and-left elastic arms 64 are elastically abutted against the front surface (the upper surface) of the panel 30 so as to allow the change of the thickness of the panels 30 and 30a.

(Attachment Method of Pipe 20)

Next, an attachment method of the pipe 20 relative to the clamp 10 fixed in the panel 30 will be explained.

As shown in FIG. 16, the pipe 20 is matched to the pipe insertion path 52 of the flexible member 50, and is inserted toward the pipe holding portion 51.

As shown in FIG. 17, when the pipe 20 is inserted into the pipe insertion path 52, the pipe 20 abuts against the opposite pieces 63 of the clamp main body 40. Here, when the pipe 20 is strongly pushed in, the right-and-left opposite pieces 63 are pressed by the outer circumference of the pipe 20, and are bent in a direction that the right-and-left opposite pieces 63 are separated from each other.

At that time, the flexible member 50 is also bent by being pressed by the right-and-left opposite pieces 63. The flexible member 50 is bent by a relatively light force by the first and second cut-out portions 54 and 55 which are respectively positioned outside the pipe insertion path 52 so as to prevent a rise in an insertion force of the pipe 20.

The right-and-left opposite pieces 63 bend in the direction that the right-and-left opposite pieces 63 are separated from each other, so that the groove width of the pipe insertion path 52 of the flexible member 50 expands, the pipe 20 passes through the pipe insertion path 52, and as shown in FIG. 6, the pipe 20 is fitted in the pipe holding portion 51 of the flexible member 50.

When the pipe 20 is fitted in the pipe holding portion 51 of the flexible member 50, since the internal diameter of the pipe holding portion 51 is set smaller than the external diameter of the pipe 20, the pipe 20 is elastically held inside the pipe holding portion 51 so as to have the anti-vibration function.

Also, both the opposite pieces 63 extend up to the position adjacent to the pipe holding portion 51 of the flexible member 50, i.e., downwardly, and the lower end portions of both the opposite pieces 63 protrude toward the inside of the pipe insertion path 52 from one portion of the flexible member 50 adjacent to the end portions. Accordingly, when the pipe 20 passes through the pipe insertion path 52, the outer circumference of the pipe 20 and the flexible member 50 never contact, and the pipe 20 is fitted in the pipe holding portion 51.

Moreover, since the flexible member 50 having the anti-vibration function is provided as a separate body from the clamp main body 40, a modification of an allowable diameter and the like of the pipe 20 is easy, and an adjustment can be easily carried out.

Namely, the allowable diameter of the pipe 20 is related to the internal diameter of the pipe holding portion 51 of the flexible member 50. However, by preparing the flexible member having a different internal diameter of the pipe holding portion 51, the flexible member 50 having the different internal diameter of the pipe holding portion 51 can be placed in the same clamp main body 40 without modifying a design of the clamp main body 40, so that there is an advantage that the modification of the allowable diameter of the pipe 20 can be easily carried out. In a similar manner, by changing the internal diameter of the pipe holding portion 51, there is an advantage that the adjustment of the allowable diameter of the pipe 20 can be easily carried out.

(Falling-Out Prevention of Pipe 20)

On the other hand, as shown in FIG. 18, a case wherein a force, in a direction wherein the pipe 20 falls out of the pipe insertion path 52 of the flexible member 50, acts on the pipe 20 attached to the clamp 10, will be explained.

When a force in a falling-out direction acts on the pipe 20, inside the pipe holding portion 51, the flexible member 50 elastically deforms by being pressed by the outer circumference of the pipe 20. Moreover, the flexible member 50 elastically deforms, so that through the flexible member 50, the plane surface portion 63b of the clamp main body 40 made of hard resin is pressed.

Consequently, the plane surface portion 63b made of hard resin receives the load in the removal direction acting on the pipe 20, so that while maintaining an anti-vibration effect by the flexible member 50, the plane surface portion 63b can compensate a deficiency of a single strength of the flexible member 50.

(Second Embodiment)

Next, a second embodiment of the present invention will be explained using FIGS. 19 to 23.

A characteristic of the present embodiment is that the elastic arms 64 of the clamp main body 40 of the first embodiment explained earlier using FIGS. 1 to 18 are omitted, and elastic legs 100 are formed in the flexible member 50.

Namely, on both right and left sides of the lower end portion of the flexible member 50, there is formed the pair of piece-like elastic legs 100 extending obliquely downward in an inverted "V" shape.

In contrast to this, in the clamp main body 40, there is provided a right-and-left pair of notch portions 110 and 110 wherein the elastic legs 100 of the flexible member 50 pass, and which pass through from the inner circumference to the outer circumference.

Consequently, when the clamp main body 40 and the flexible member 50 are assembled, through the notch portions 110 of the clamp main body 40, the elastic legs 100 of the flexible member 50 protrude to an outside of the clamp main body 40.

Although it is not shown in the drawings, the elastic legs 100 of the flexible member 50 elastically abut against the front surface (the upper surface) of the panel 30 in the same manner as the elastic arms 64 of the clamp main body 40 of the first embodiment so as to allow the change of the thickness of the panels 30 and 30a.

Incidentally, although the right-and-left pair of elastic legs 100 of the flexible member 50 is formed, the right-and-left pair of elastic legs 100 is not limited to this, and only one of the elastic legs 100 may be provided. Also, in an explanation of the present embodiment, the same symbols are assigned to the same structural parts as the first embodiment, and their explanations are omitted.

(Third Embodiment)

Next, a third embodiment of the present invention will be explained using FIG. 24 or after.

Figure 24:
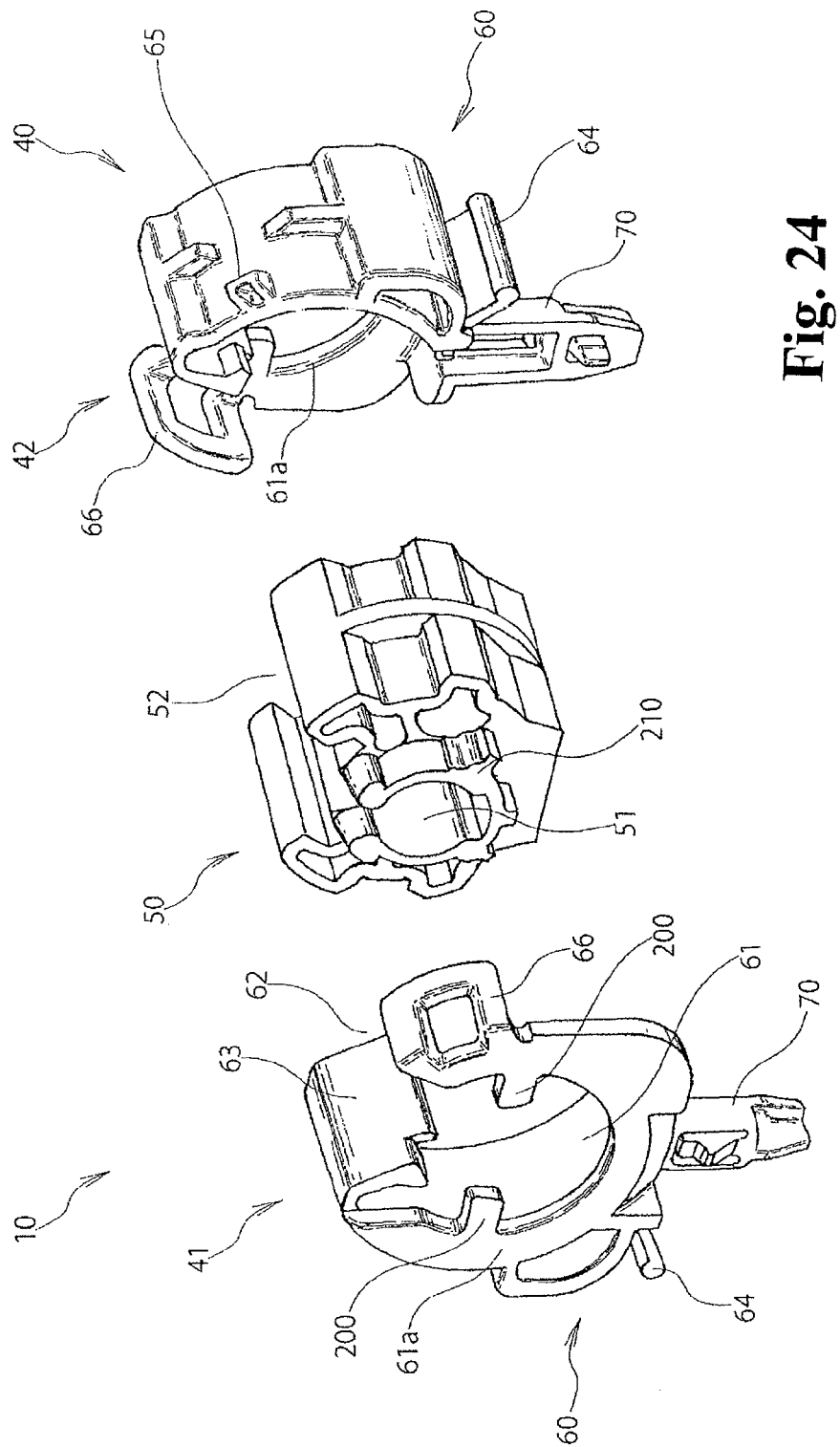
FIGS. 24 to 40 show a third embodiment of the present invention.
Figure 25:
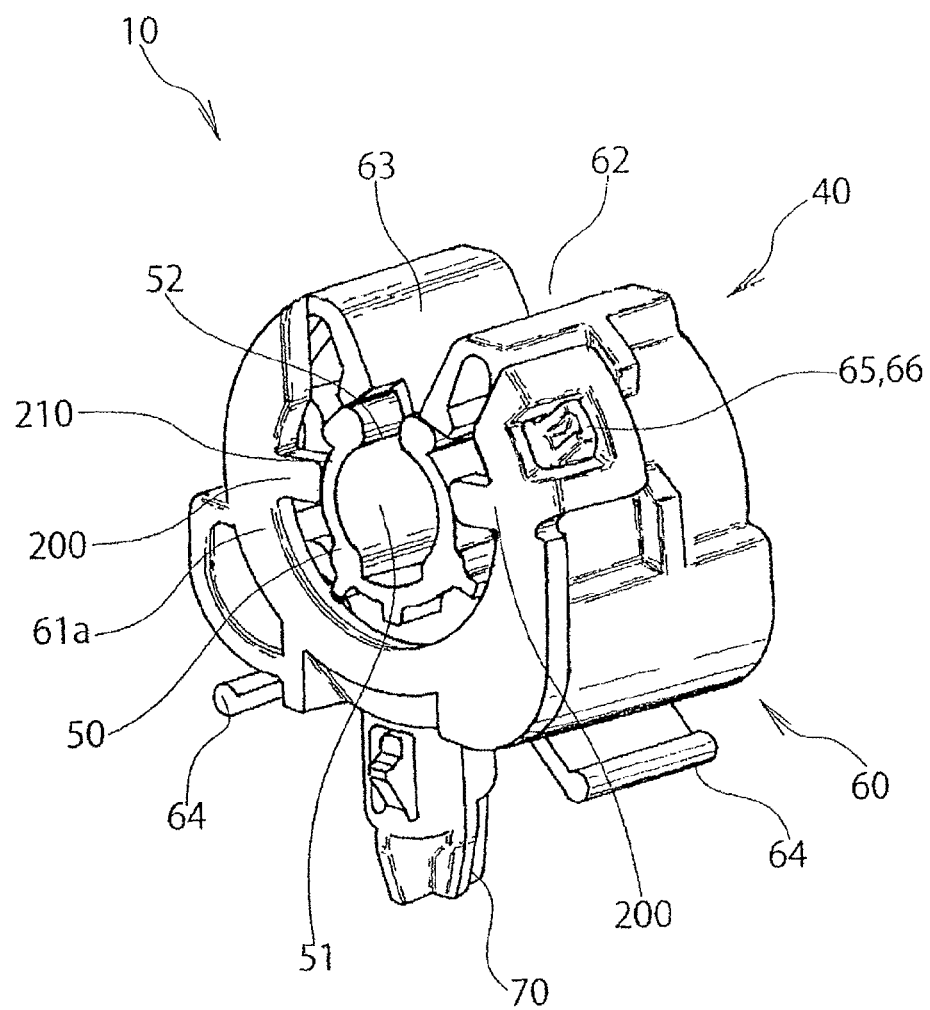
Figure 26:
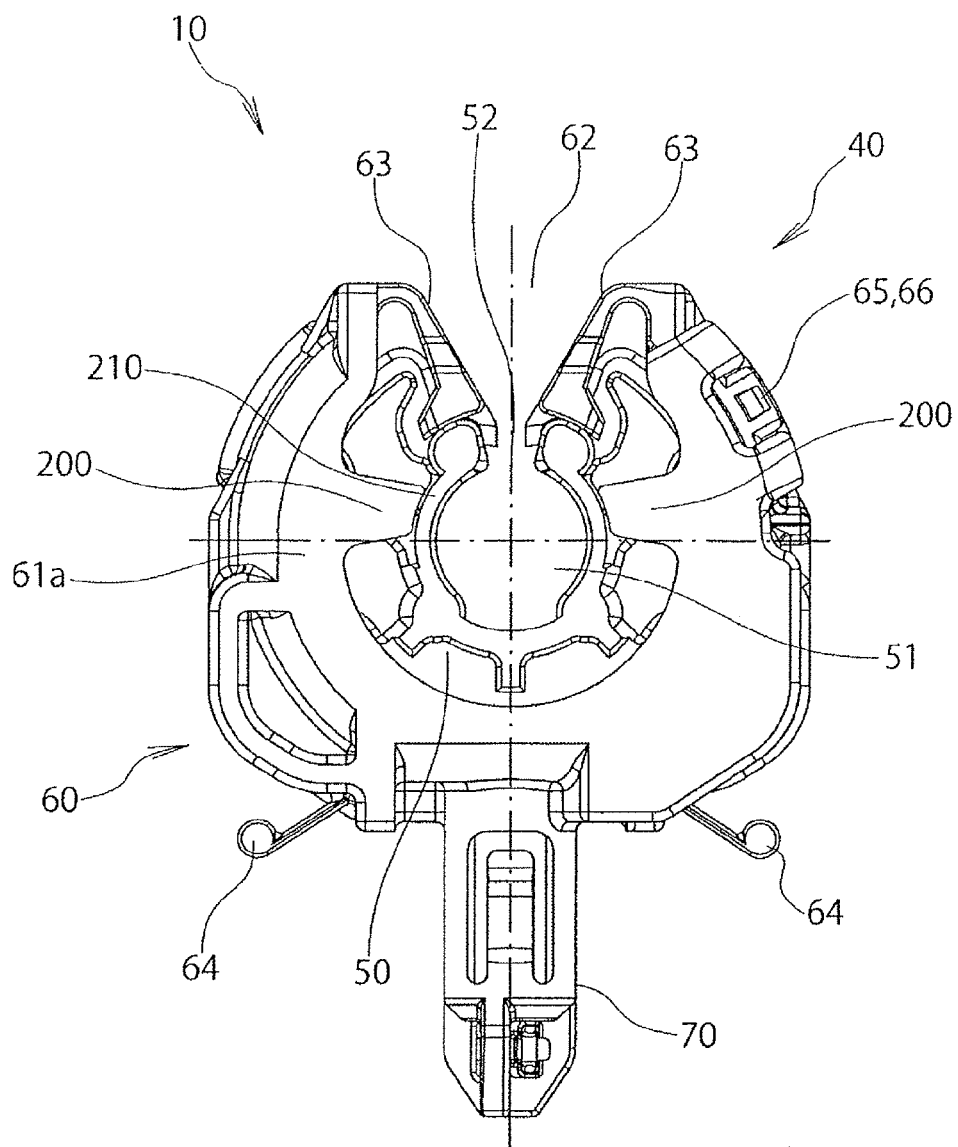
Figure 27:
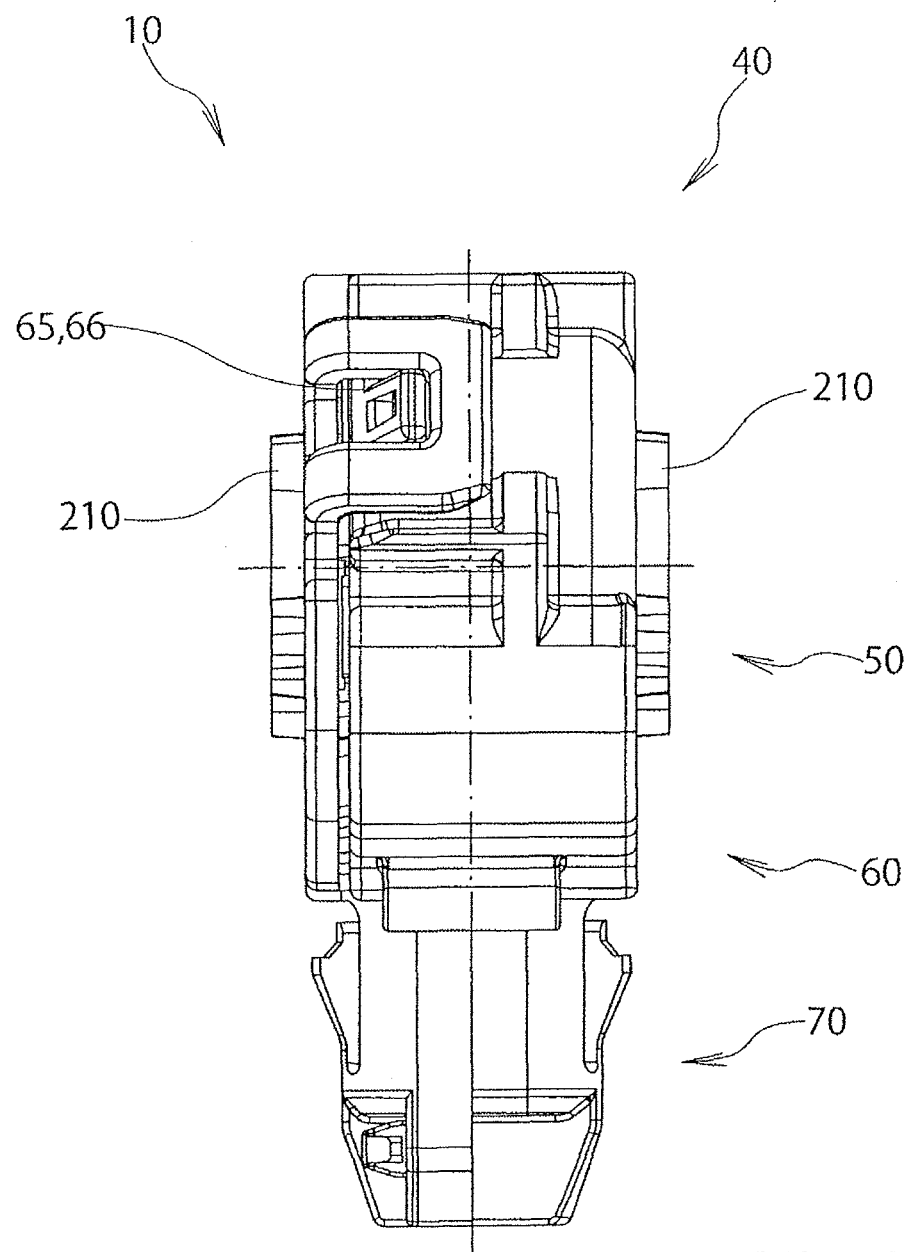
Figure 28:
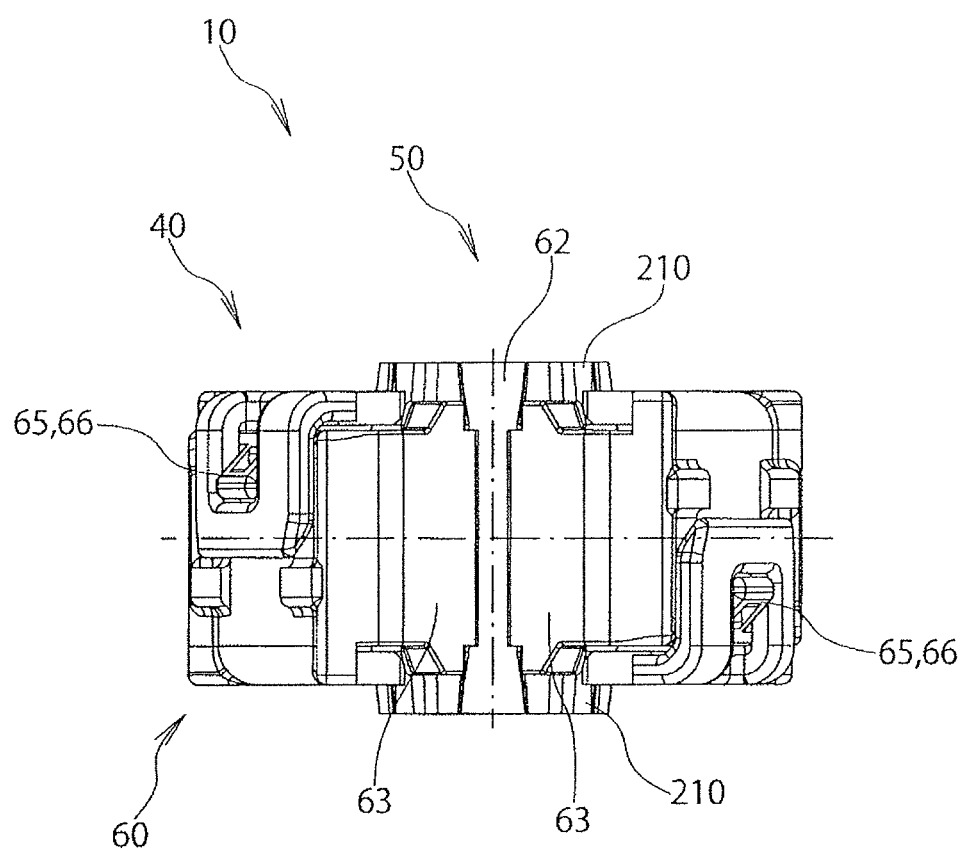
Figure 29:
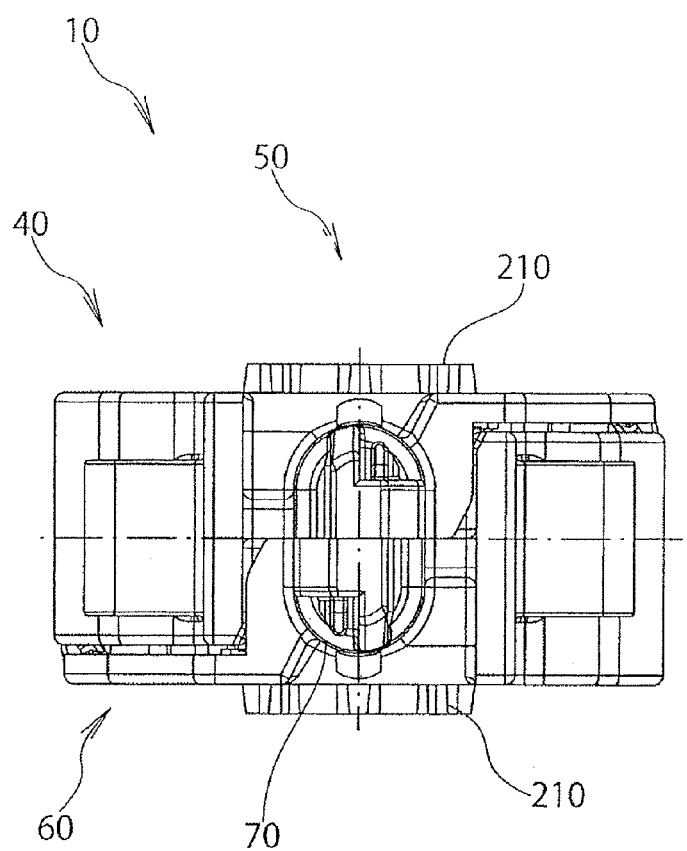
Figure 30:
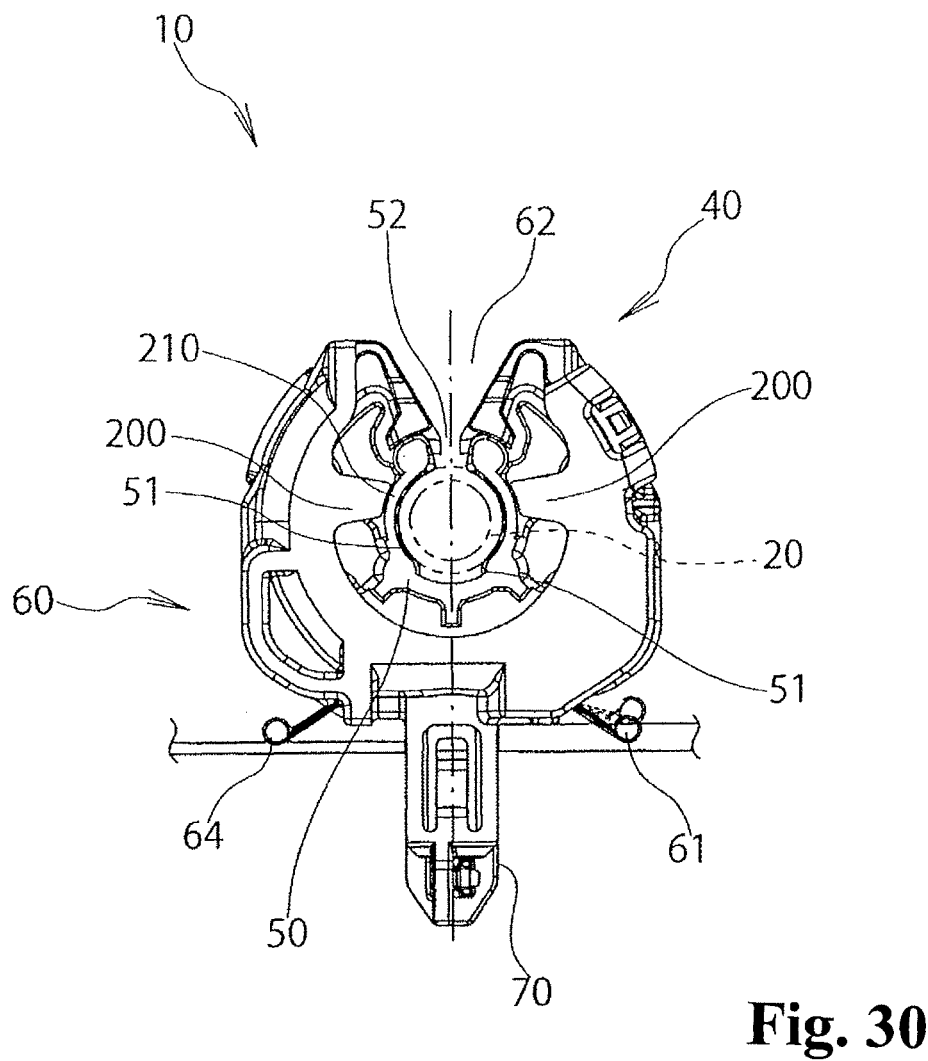

A characteristic of the present embodiment is that, as shown in FIGS. 24 and 25, pipe support portions 200 extending toward the pipe insertion path 52 of the flexible member 50 are formed in the clamp main body 40.

Figure 31:
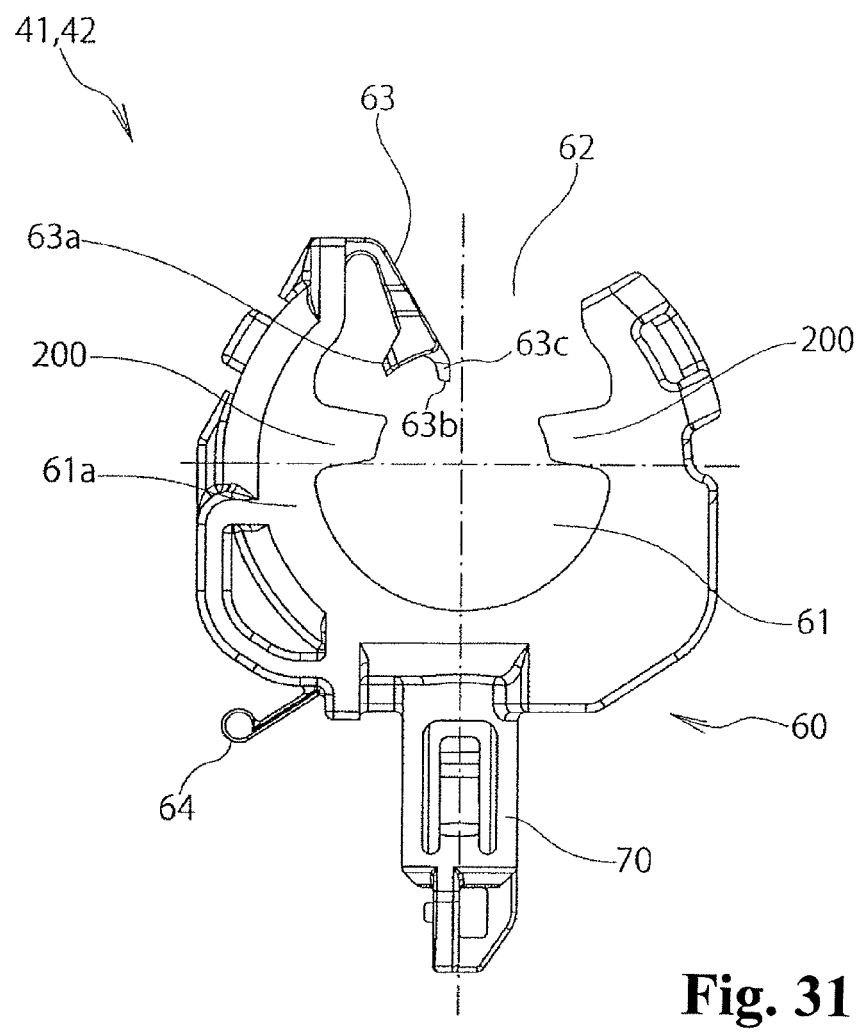
Figure 32:
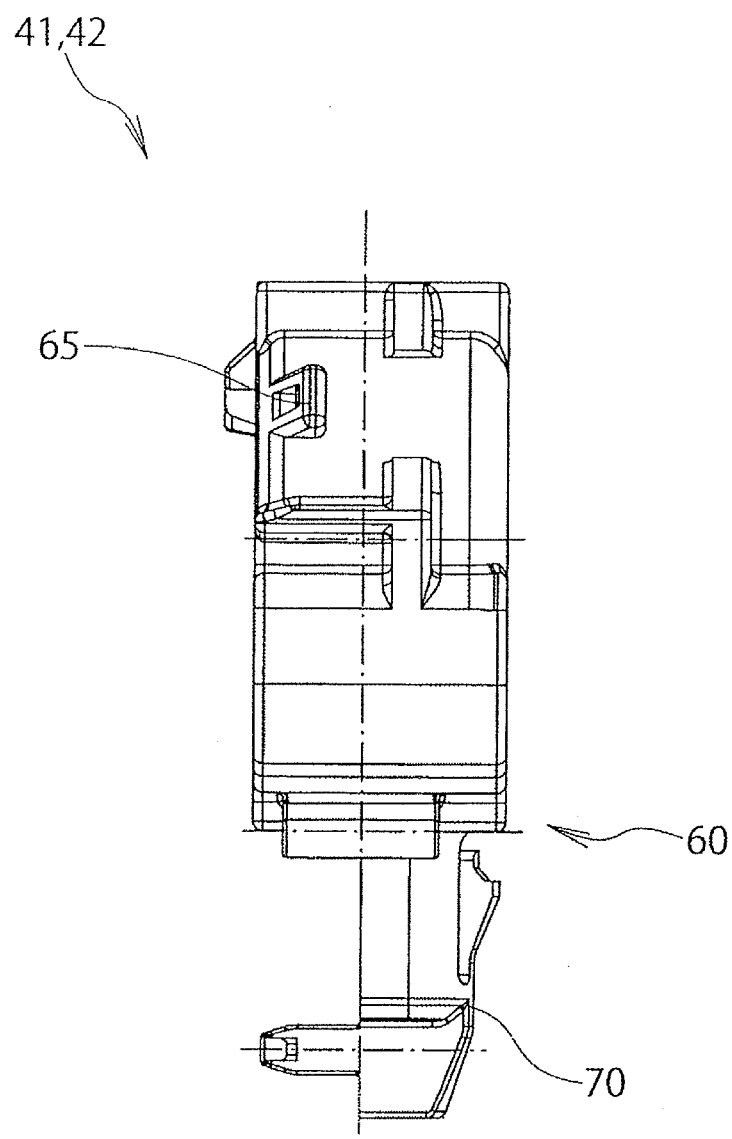

Namely, as shown in FIGS. 24 to 26, 31, and 33, in two pieces of the piece half portions 41 and 42 of the clamp main body 40, there is respectively formed the pair of pipe support portions 200 protruding toward the center from both right and left sides. Specifically, the pipe support portions 200 extend from the projecting edge portion 61a of the frame body 60 in a tongue piece manner. The pipe support portion 200 on the left side of FIG. 31 is positioned on the lower side of the opposite piece 63, the pipe support portion 200 on the right side of FIG. 31 is positioned on the lower side of the lock piece 66, and the pipe support portions 200 are symmetrically formed relative to a center line of the frame body 60. Also, end portions of the pipe support portions 200 obliquely slope toward the lower side in a direction of approaching the projecting edge portion 61a.

Figure 43:
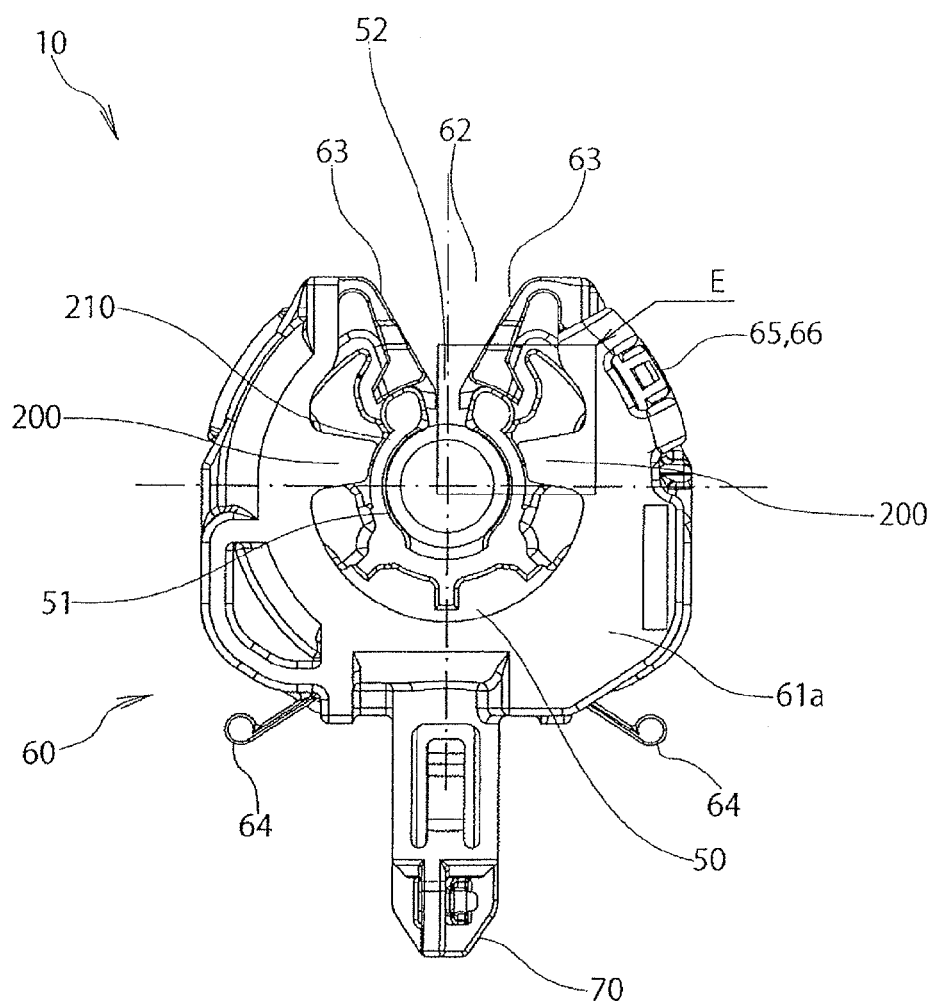
FIG. 43 is an explanatory view wherein a clamp including the pipe support portion is viewed from a front view.
Figure 44:
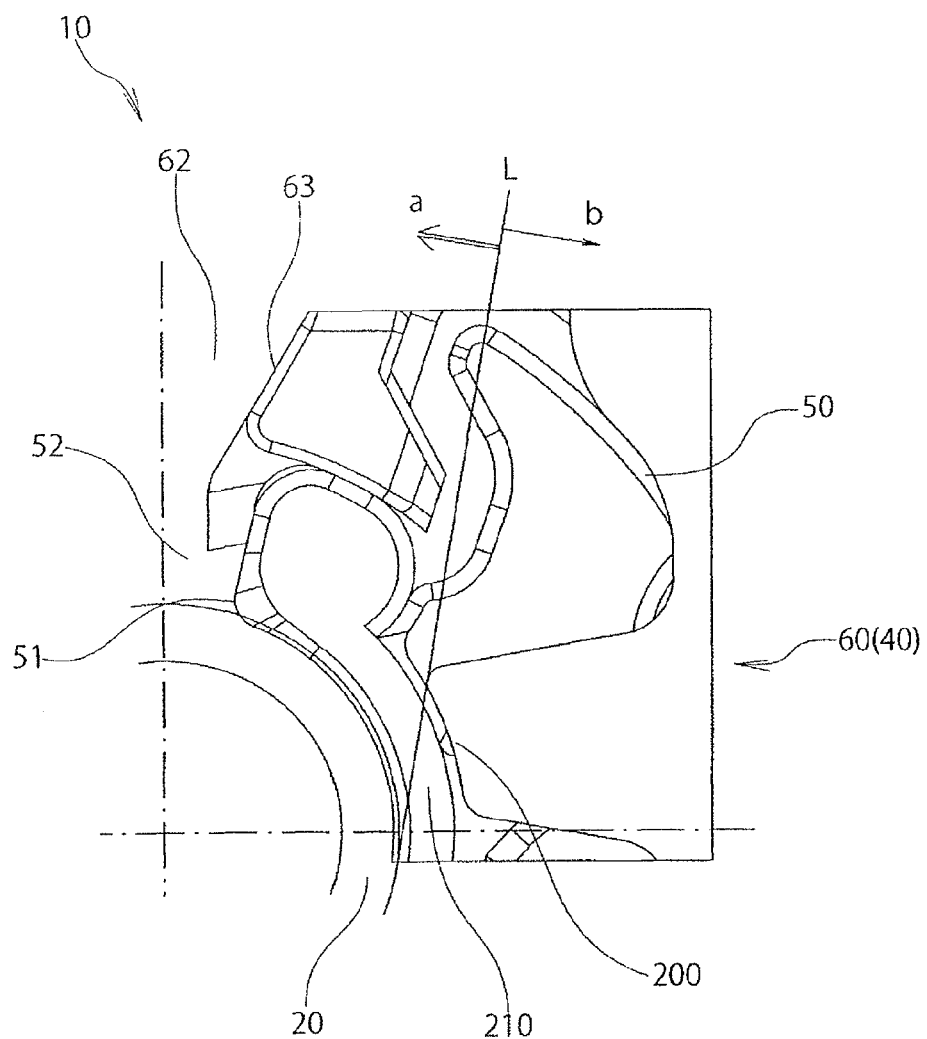
FIG. 44 is an explanatory view wherein the D portion in FIG. 41 is expanded.

In contrast to this, as shown in FIGS. 24 to 30, and 36 to 39, in the pipe insertion path 52 of the flexible member 50, there is formed an abutment portion 210 which can abut against the pipe support portions 200. Specifically, in FIG. 37, the abutment portion 210 protrudes in the right-and-left direction, and also in FIG. 36, the abutment portion 210 is formed along a circumference of the pipe holding portion 51 in an approximately U shape which is open upward. An outer circumferential surface of the abutment portion 210 faces the end portions of the pipe support portions 200, and may always abut against the end portions of the pipe support portions 200, or may be separated from the end portions of the pipe support portions 200 for a predetermined interval. In a case where the outer circumferential surface of the abutment portion 210 is separated from the end portions of the pipe support portions 200, when the pipe 20 held inside the pipe holding portion 51 is displaced due to a twist and the like, as shown in FIGS. 43 and 44, the outer circumferential surface of the abutment portion 210 abuts against the end portions of the pipe support portions 200.

The outer circumferential surface of the flexible abutment portion 210 abuts against the end portions of the hard pipe support portions 200 so as to control a deformation of the flexible member 50. Consequently, a displacement of the pipe 20 inside the pipe holding portion 51 is also controlled.

Figure 33:
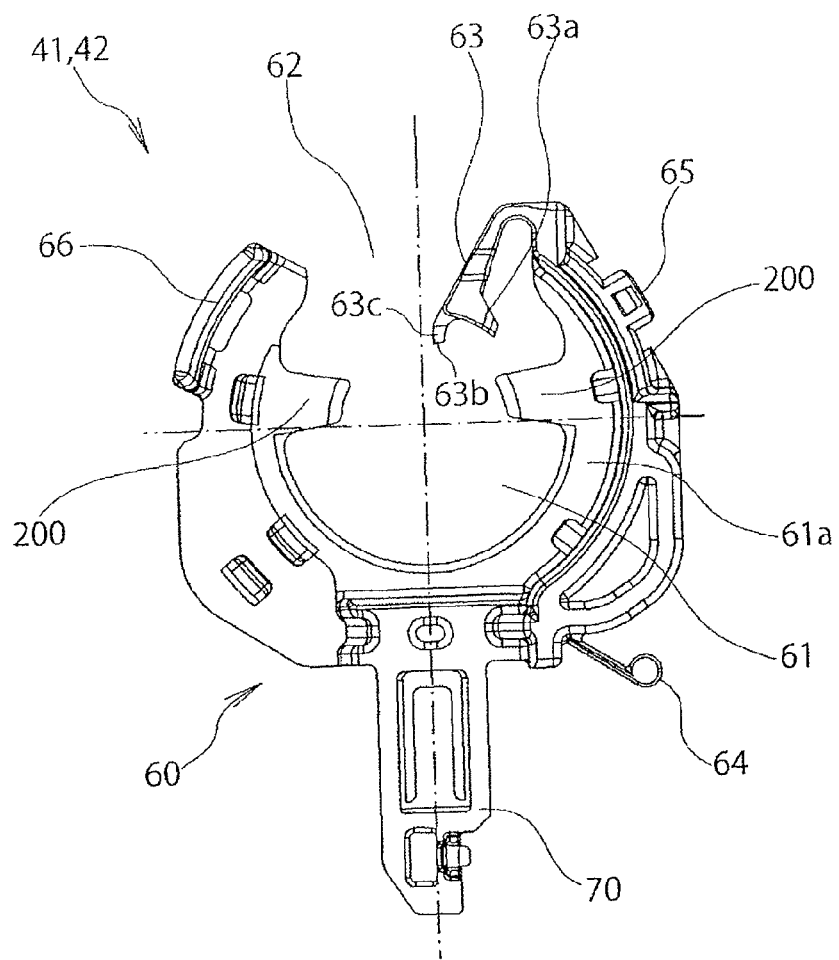
Figure 34:
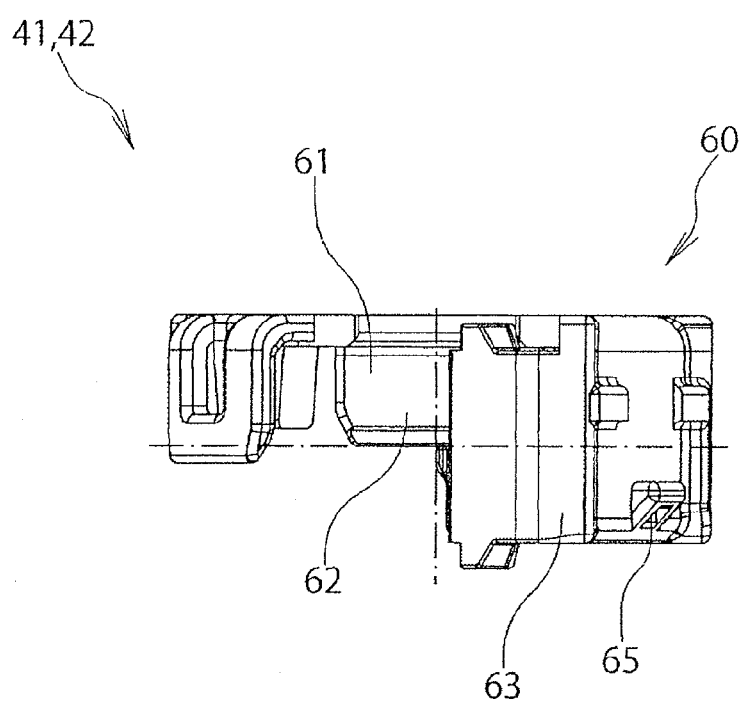
Figure 35:
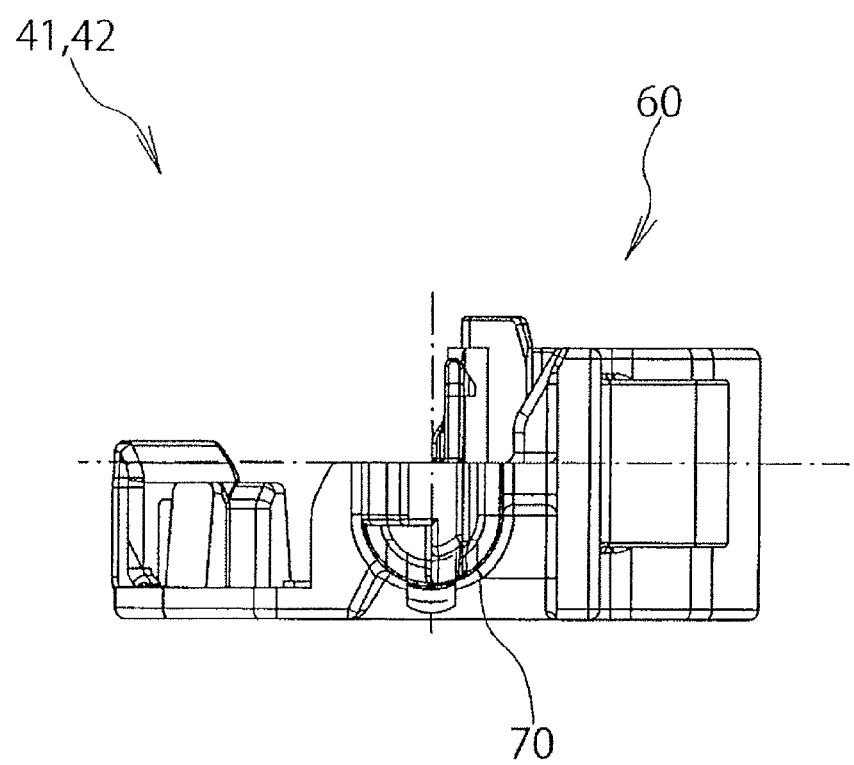
Figure 36:
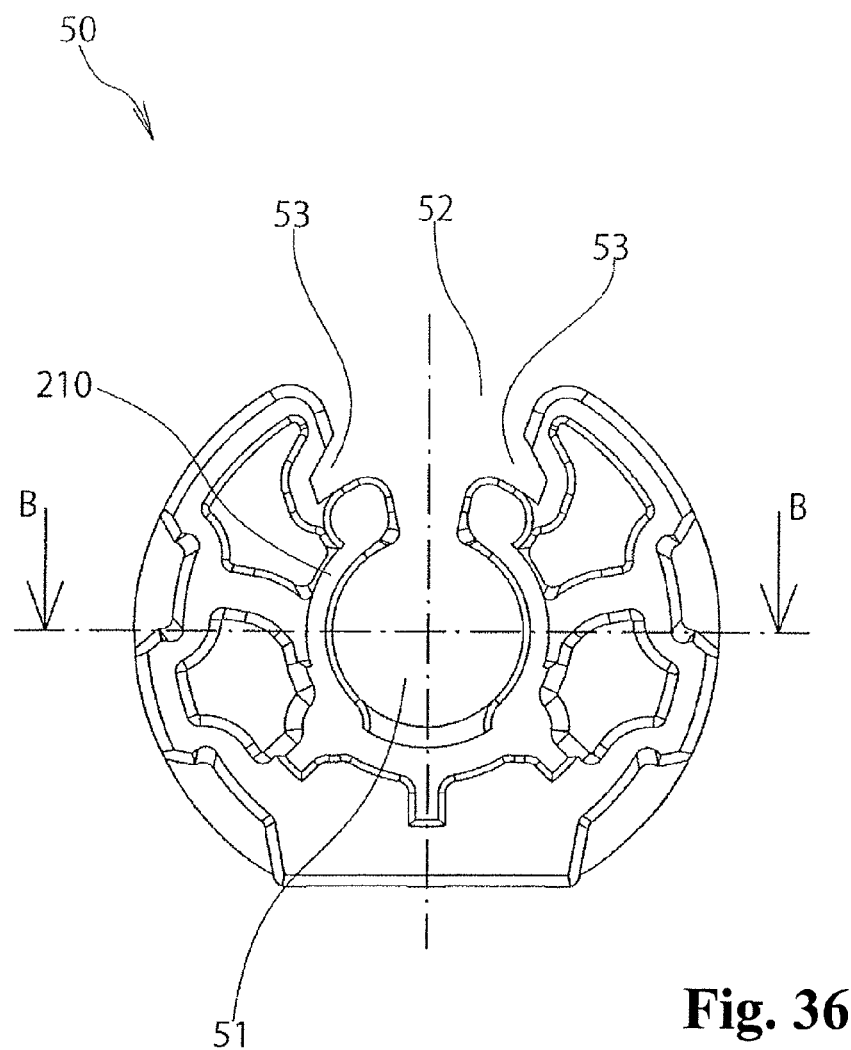
Figure 37:
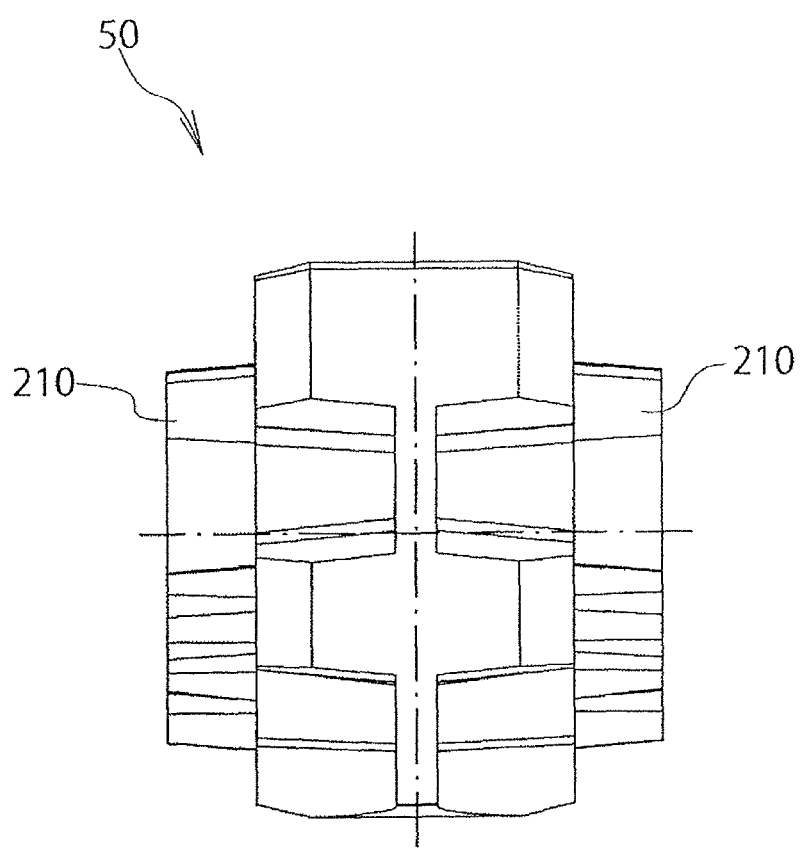
Figure 38:
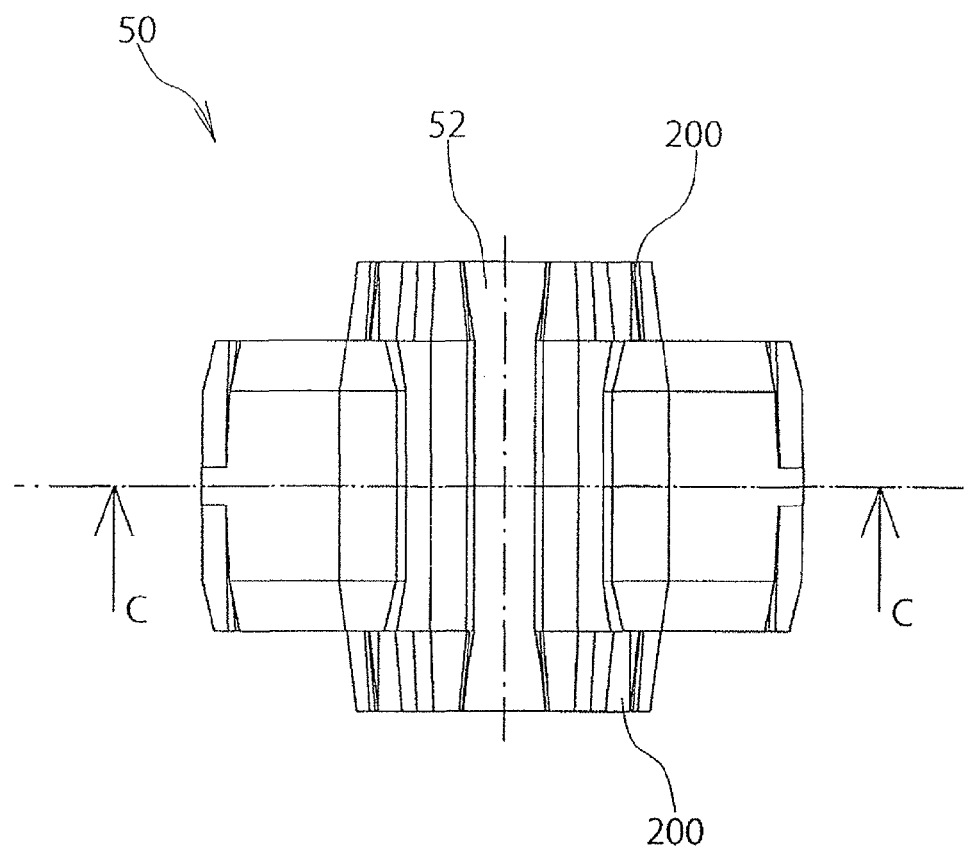
Figure 39:
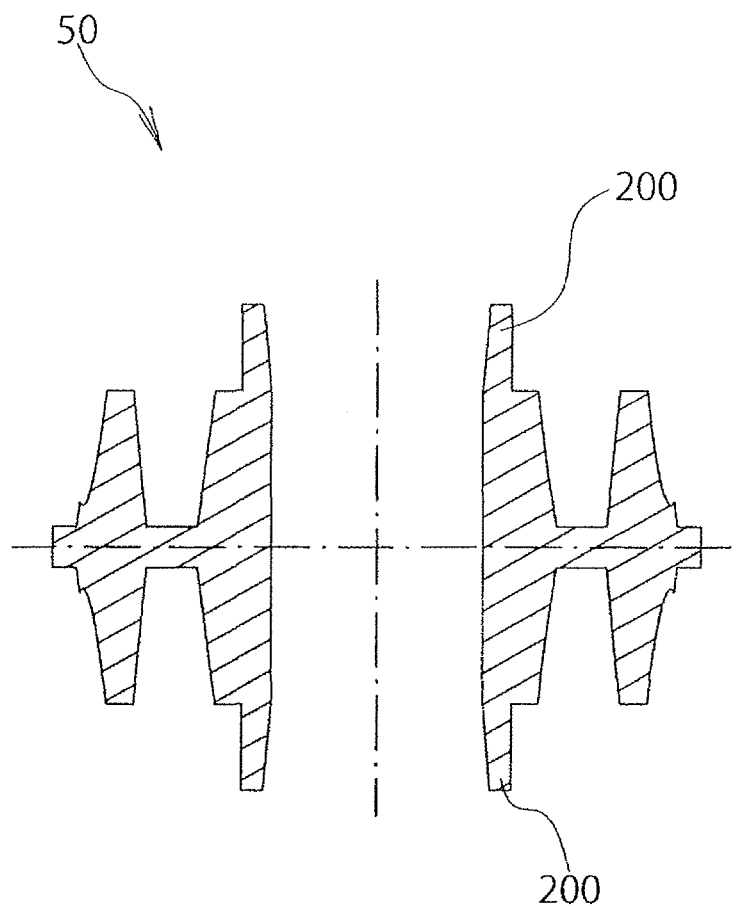
Figure 40:
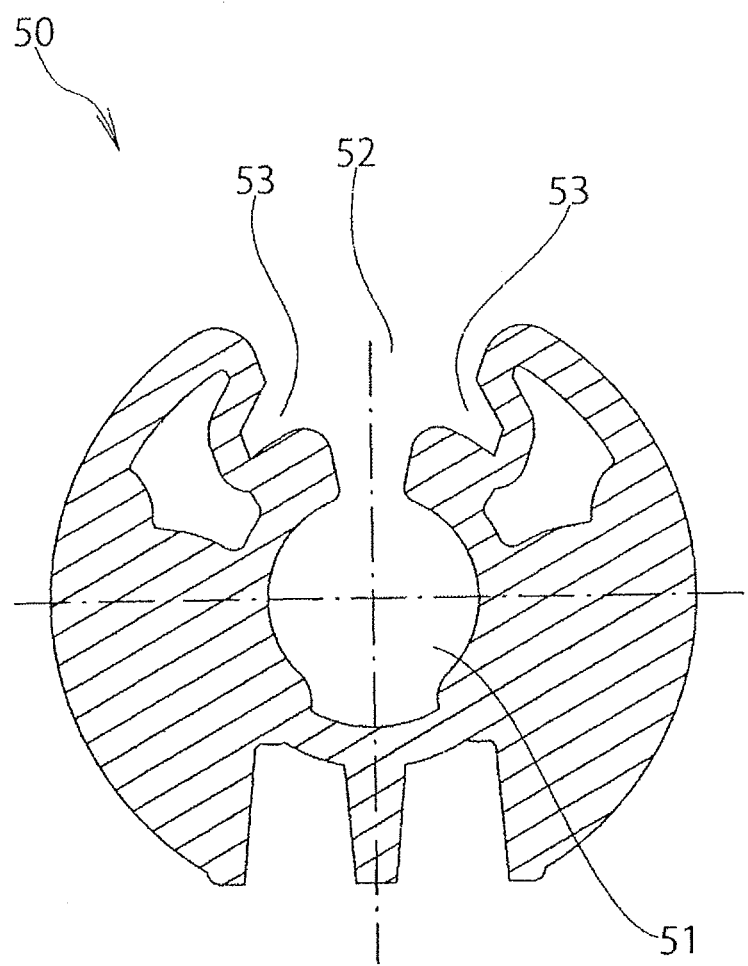

On the other hand, as shown in FIGS. 31 and 33, each opposite piece 63 of the piece half portions 41 and 42 comprises the claw portion 63a and the plane surface portion 63b, and further comprises a thinned end portion 63c. An end surface of the end portion 63c is the plane surface portion 63b.

Incidentally, in the explanation of the present embodiment, the same symbols are assigned to the same structural parts as the first embodiment explained earlier using FIGS. 1 to 18, and their explanations are omitted.

(Operation of Pipe Support Portions 200)

Next, an operation of the pipe support portions 200 will be explained using FIGS. 41 to 44.

Figure 41:
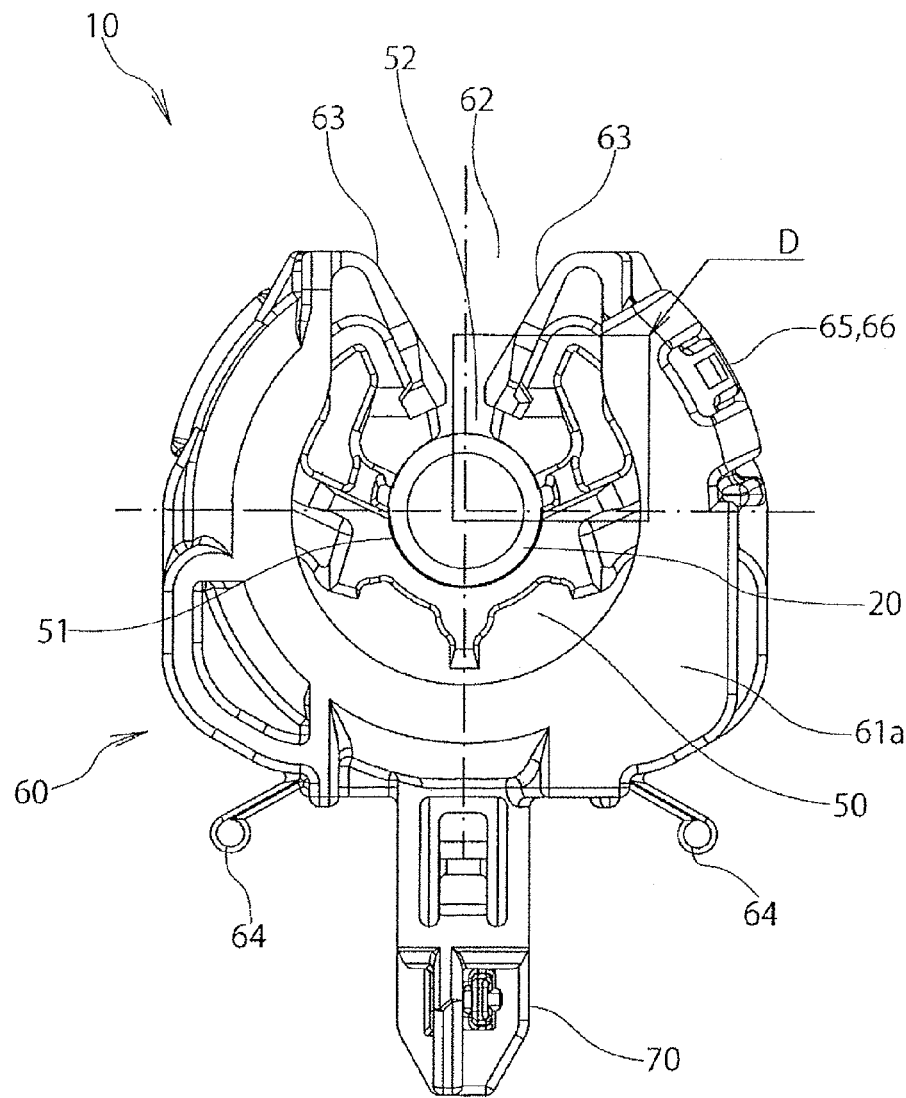
FIG. 41 is an explanatory view wherein a clamp without a pipe support portion is viewed from a front surface.

First, for comparison, a movement in a case without the pipe support portions 200 will be explained using FIGS. 41 and 42.

Figure 42:
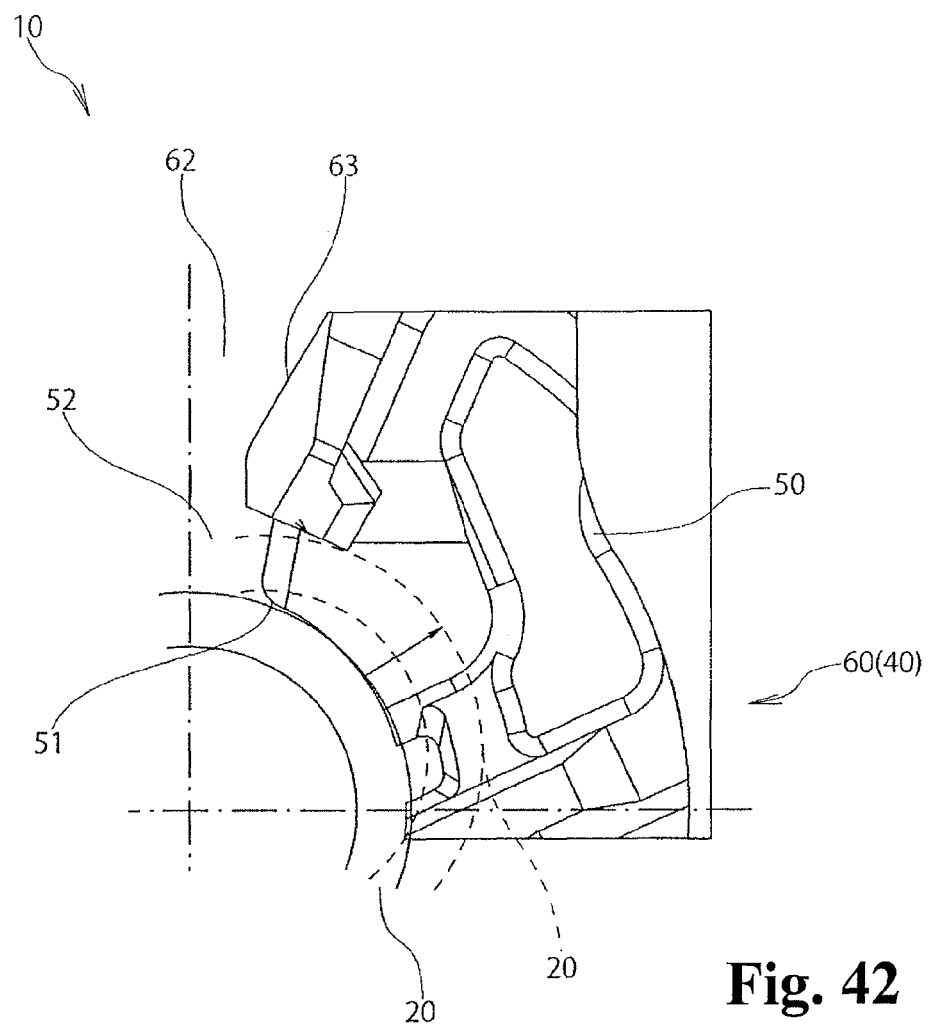
FIG. 42 is an explanatory view in which a D portion in FIG. 41 is expanded.

In the case without the pipe support portions 200, due to the twist and the like, there is a risk that the pipe 20 may be displaced as shown by dotted lines in FIG. 42. At that time, since the flexible member 50 happens to deform by being pressed by the outer circumference of the pipe 20, a control force relative to the displacement of the pipe 20 due to the twist and the like is low.

In contrast to this, as shown in FIG. 44, in a case including the pipe support portions 200, as a border of a virtual line L contacting with the end portion of the pipe support portion 200 protruding the most toward the inside of the pipe insertion path 52, in a direction of an arrow a on the left side of FIG. 44, the pipe 20 is held inside the pipe holding portion 51, so that the pipe 20 never be displaced or never move in a direction of an arrow b on the'right side of FIG. 44 beyond the virtual line L.

Namely, without the pipe support portions 200, due to the displacement of the pipe 20, the deformation and misalignment of the flexible member 50 occur, and the pipe 20 hits against the end portion 63c (see FIGS. 31 and 33) so as to have a risk of causing wobbling. In contrast to this, by providing the pipe support portions 200, the aforementioned wobbling can be prevented.

Also, when the pipe 20 is displaced due to the twist and the like, the abutment portion 210 of the flexible member 50 elastically abuts against the end portions of the pipe support portions 200 so as to have a cushioning action.

Incidentally, all contents of the specifications, claims, drawings, and abstracts of Japanese Patent Application No. 2009-270207 filed on Nov. 27, 2009, and Japanese Patent Application No. 2010-174925 filed on Aug. 3, 2010 are cited in their entireties herein and are incorporated as a disclosure of the specification of the present invention.

What is claimed is:

1. A clamp, comprising:
    a clamp main body made of a rigid member and including a pair of half portions engaging each other, the pair of half portions including a first half portion and a second half portion, each half portion having a semi-circular shape portion including an opposite piece formed on a first end portion thereof and a lock piece formed on a second end portion thereof facing the first end portion with a space therebetween, the lock piece of the first half portion engaging the semi-circular shape portion of the second half portion, and the lock piece of the second half portion engaging the semi-circular shape portion of the first half portion such that the opposite pieces are positioned to face each other; and
    a flexible member including a pipe holding portion for holding a pipe, and a pipe insertion path communicating at a first end portion thereof with the pipe holding portion and having an outward opening on a second end portion thereof, the flexible member being held between the pair of half portions of the clamp main body,
    wherein the opposite pieces of the pair of half portions define the pipe insertion path, at least one opposite piece is adapted to be pressed by an outer circumference of the pipe inserted into the pipe insertion path, and is flexible in a direction such that the pipe insertion path expands,
    the at least one opposite piece extends to a position adjacent to the pipe holding portion,
    an extending end portion of the at least one opposite piece protrudes toward an inside of the pipe insertion path relative to one portion of the flexible member adjacent to the extending end portion,
    each of the pair of half portions includes a lock claw, and the lock piece having a lock hole formed therein, the lock claw and the lock piece respectively protruding from an outer circumference of the semi-circular shape portion, and
    the lock claws are respectively arranged around the first end portions of the semi-circular shape portions so that the lock claw of the first half portion engages the lock hole of the second half portion, and the lock claw of the second half portion engages the lock hole of the first half portion, respectively, when the pair of half portions engages each other.

2. A clamp according to claim 1, wherein the extending end portion of the at least one opposite piece includes a plane surface portion for receiving a load in a removal direction of the pipe.

3. A clamp according to claim 1, wherein the extending end portion of the at least one opposite piece includes a claw portion, and the flexible member includes a depressed portion to fit the claw portion.

4. A clamp according to claim 1, wherein the flexible member includes at least a cut-out portion in a direction such that one opposite piece flexes.

5. A clamp according to claim 1, wherein the clamp main body includes a pipe support portion extending toward the pipe insertion path.

6. A clamp according to claim 1, wherein the second half portion is separable from the first half portion, and the first half portion and the second half portion engage each other in a width direction of the flexible member to hold the flexible member therebetween.

7. A clamp according to claim 1, wherein each of the pair of half portions includes a support leg adapted to be inserted into a hole of a panel and extending downwardly from each of the semi-circular shape portions; and
    each of the semi-circular shape portions includes an elastic arm protruding downwardly from a lower portion thereof, and the support leg has an elastic claw protruding upwardly therefrom and adapted to support the panel between the elastic arms and the elastic claws.

8. A clamp according to claim 7, wherein the support leg includes a positioning projection and a positioning hole adjacent to the positioning projection, and the positioning projection inwardly protrudes in a direction opposite to the elastic claw; and
    the positioning projection of the first half portion engages the positioning hole of the second half portion, and the positioning projection of the second half portion engages the positioning hole of the first half portion, respectively.

9. A clamp according to claim 1, wherein the opposite pieces and the lock pieces extend in width directions of the pair of half portions, respectively.

10. A clamp according to claim 1, wherein the semi-circular shape portion of the first half portion has a width to extend toward the second half portion, and the semi-circular shape portion of the second half portion has a width same as the width of the semi-circular shape portion of the first half portion to extend toward the first half-portion, thereby forming a hollow portion for fitting the flexible member therebetween.

11. A clamp according to claim 1, wherein the flexible member includes a flexible abutment portion formed around the pipe insertion path; and
    each of the pair of half portions includes a projecting edge portion, and a pipe support portion integrally formed therewith and extending inwardly from an inner circumferential edge of the projecting edge portion to abut an outer circumferential surface of the flexible abutment portion.

* * * * *